United States Patent
McNabb et al.

(10) Patent No.: US 6,289,462 B1
(45) Date of Patent: Sep. 11, 2001

(54) TRUSTED COMPARTMENTALIZED COMPUTER OPERATING SYSTEM

(75) Inventors: Paul A. McNabb; Pavel S. Slavin, both of Champaign; Chad J. Hanson; Randall J. Sandone, both of Urbana, all of IL (US)

(73) Assignee: Argus Systems Group, Inc., Savoy, IL (US)

( * ) Notice: Subject to any disclaimer, the term of this patent is extended or adjusted under 35 U.S.C. 154(b) by 0 days.

(21) Appl. No.: 09/407,633

(22) Filed: Sep. 28, 1999

Related U.S. Application Data
(60) Provisional application No. 60/102,019, filed on Sep. 28, 1998.

(51) Int. Cl.[7] .................................................. G60F 11/00
(52) U.S. Cl. ................................................................ 713/201
(58) Field of Search ................................ 713/200, 201; 709/225, 229

(56) References Cited

U.S. PATENT DOCUMENTS

| | | |
|---|---|---|
| 5,596,718 | 1/1997 | Boebert et al. . |
| 5,845,068 * | 12/1998 | Winiger .................. 713/200 |
| 5,903,732 | 5/1999 | Reed et al. . |
| 5,937,159 * | 8/1999 | Meyers .................. 713/201 |
| 6,023,765 * | 2/2000 | Kuhn ..................... 713/200 |
| 6,029,247 * | 2/2000 | Ferguson ............... 713/201 |
| 6,052,785 * | 4/2000 | Lin ....................... 713/201 |

OTHER PUBLICATIONS

W. Steen et al., "NetWare Security", New Riders Publishing, Chapter 10, pp. 248–277, Dec. 31, 1996.

* cited by examiner

*Primary Examiner*—Robert Beausoleil
*Assistant Examiner*—Bryce P. Bonzo
(74) *Attorney, Agent, or Firm*—Greenberg Traurig, LLP; Anthony R. Barkume

(57) ABSTRACT

A system and method for providing a trusted server which controls access to the execution of processes by applying file level extended sensitivity label attributes. The attributes are utilized to restrict execution of processes that are requested by comparing the extended attributes in addition to using standard file permission authorization. The system additionally may be used to provide controlled execution of commercially available software.

12 Claims, 16 Drawing Sheets

| Attribute | PROCESS/PACKET | FILE | Sample Data Process | Sample Data File |
|---|---|---|---|---|
| Effective SL | X | X | Secret | Secret |
| Maximum SL (clearance) | X | X | Top Secret | Top Secret |
| Minimum SL (clearance) | X | | Confidential | |
| Information Label | X | X | Secret "internal use" | Secret "company-wide" |
| Integrity Label | X | X | Secret | Secret |
| Limiting privileges | X | | PV_ASN, PV_SU, PV_MAC | |
| Maximum privileges | X | | PV_ASN, PV_SU | |
| Effective privileges | X | | PV_ASN | |
| Authorized privileges | | X | | PV_PV_FILE |
| Innate privileges | | X | | PV_SR, PV_SU |
| Proxy privileges | | X | | PV_ASN, PV_PV_PROC |
| Limiting authorization set | (implied) | X | | CHIL, CHSL |
| Privilege authorization set | | X | | AUDITSYS, BOOT |
| Access authorization set | | X | | DEBUG, MAKEIDB |
| Capability domain | X | X | (in design) | (in design) |
| File security flag | | X | | FSF_EPS, FSF_AUDIT |
| User ID | X | X | 4321 | 22334 |
| Group ID | X | X | 10 | 65432 |

| Attribute | PROCESS/PACKET | FILE | Sample Data Process | Sample Data File |
|---|---|---|---|---|
| Effective SL | X | X | Secret | Secret |
| Maximum SL (clearance) | X | X | Top Secret | Top Secret |
| Minimum SL (clearance) | X | | Confidential | |
| Information Label | X | X | Secret "internal use" | Secret "company-wide" |
| Integrity Label | X | X | Secret | Secret |
| Limiting privileges | X | | PV_ASN, PV_SU, PV_MAC | |
| Maximum privileges | X | | PV_ASN, PV_SU | |
| Effective privileges | X | | PV_ASN | |
| Authorized privileges | | X | | PV PV PV FILE |
| Innate privileges | | X | | PV_SR, PV_SU |
| Proxy privileges | | X | | PV_ASN, PV PV PV PROC |
| Limiting authorization set | (implied) | X | | CHIL, CHSL |
| Privilege authorization set | | X | | AUDITSYS, BOOT |
| Access authorization set | | X | | DEBUG, MAKEIDB |
| Capability domain | X | X | (in design) | (in design) |
| File security flag | | X | | FSF_EPS, FSF_AUDIT |
| User ID | X | X | 4321 | 22334 |
| Group ID | X | X | 10 | 65432 |

FIG. 4

| SENSITIVITY LABEL | | | | | | | | |
|---|---|---|---|---|---|---|---|---|
| CLASSIFICATION | COMPARTMENTS/CATEGORIES | | | | | | | |
|  | A | B | C | D | E | F | G | ... |
| TOP SECRET | X |  |  |  |  |  |  |  |
| SECRET |  | X | X |  | X |  |  |  |
| CONFIDENTIAL |  |  |  | X |  | X |  |  |
| SENSITIVE |  |  |  | X |  | X | X |  |
| PUBLIC |  |  |  |  |  | X | X |  |

FIG. 10

TRUSTED COMPARTMENTALIZED COMPUTER OPERATING SYSTEM

CROSS REFERENCE TO RELATED APPLICATIONS

This application is based on and claims filing priority of U.S. Provisional Application Ser. No. 60/102,019, filed on Sep. 28, 1998, which is incorporated by reference herein.

BACKGROUND OF THE INVENTION

This invention generally relates to computer systems security, and operating system design where the access, control, rights and privileges are assigned to the individual file members and not strictly to the user or process that accesses the computer. The system comprises operating system modifications to affect the access and control of processes executing on the server.

The importance of a secure networking platform (such as one for the Internet) is underscored by the following example. In early November 1988, a self-replicating program was released upon the Internet, invading VAX and Sun-3 computers running versions of Berkeley Unix. This program exploited the resources of these computers to attack other computers connected to the Internet. Within hours, this program spread across the United States, infecting 6,000 of the 60,000 existing Internet hosts. At that time, the Internet was still used almost exclusively for exchanging mail among scientists. When organizations' Internet services were limited to static web pages, mail gateways, and the like, security measures were needed primarily to ensure that electronic sales and marketing information would be available to the public. If such security failed to protect its Internet server from attack, the organization suffered temporary interruption of Internet visibility and compromise of non-critical services causing general but non-lethal administrative headaches.

Today, more and more people and firms are coming to rely on the Internet for a vast range of public and corporate services. Companies are rapidly deploying commercial applications on public Internet servers in an attempt to reduce costs and enhance their competitiveness. These integrated applications provide swift, convenient service and valuable customer control over business processes, reducing costs and improving visibility.

As transactional technologies for the Internet have blossomed, however, the potential damage resulting from security breaches has become a critical factor for companies to consider. Theft or corruption of data or denial of network services delivers a palpable blow to the organization's bottom line.

Increased reliance on mission-critical services delivered over the Internet carries with it the increased risk of an outsider opening a pipeline from the Internet to critical internal data. Prior to the adoption of web enabled interaction with applications and database information behind the firewall, an attack might have compromised the content of a web site; today, the connectivity required to implement transactional Internet applications makes these critical organizational resources vulnerable. The Internet server now provides mission-critical services to the organization and connects private and public systems and data. For example, under this new business model, systems that once provided only publicly available information to the Internet at large are now a potential doorway to confidential data such as bank account information or transaction records for computer hackers anywhere in the world.

On any computer system, certain system programs or utilities must be granted the ability to bypass the security constraints normally imposed by the system. For example, in order to create a backup of all files on the system disks, an administrator must be able to run a backup program that is able to read all files on the disk, even though the administrator would not normally be allowed such access. Other powerful programs must also be carefully controlled, such as the programs to shut down the system, create new users, and repair damaged file systems. On a standard Unix system, the operating system has been designed so that one user ID, called root or superuser, can bypass all security restrictions and limitations. Windows NT systems exhibit similar vulnerabilities with the 'System' and 'Administrator' accounts.

A utility that needs to use any restricted feature must therefore be run as root or administrator. This means for example, that the backup program can be exploited and used to shut down the system, and the shutdown program can be exploited to create new users, and the program to create new user accounts can be exploited to read all files on the system. Thus if any administration program has an exploitable bug, the program can be made to do anything on the system.

The inability of standard Unix to grant only limited rights to a program is not the system's only weakness. In Unix, when one program starts another the newly created program runs with the user ID and permissions of the first program. This means that a malicious user who can exploit a bug in a root program may be able to start up an interactive root session. If a user is running as root, every program he runs will have unlimited privileges on the system. The user can create any file, modify any file, and delete any file. The user can additionally send and receive any network packets they choose, and has the ability to intercept all packets on the network and thus view traffic between any two other hosts on the same network.

Firewalls, intrusion detection, encryption, and user authentication provide elements of perimeter and communications security that alone are inadequate for Internet-based applications requiring a high degree of security assurance. Mission-critical processes such as online banking, online stock trading, accessing sensitive databases, government tax processing, electronic commerce, or just-in-time manufacturing require systems to provide access to internal servers and databases without exposing them to compromise. These are security problems that traditional security measures simply cannot address.

Traditional security measures limit access to the system, but not actions on the system or by the system. These measures can fail in situations where authorized users with malicious intent discover and exploit unknown holes in applications or operating system software.

These products generally operate on the misconception that an authorized and authenticated user is also a trustworthy user. Consider, for example, a malicious banking customer in possession of a valid account number and PIN. Traditional security measures recognize him as an authorized, legitimate user of the system. Once allowed access to the Internet server, this account holder could attack the server and use it as a bridgehead for entry into back-end databases and financial servers.

In studies conducted by several well-known computer industry analysts, security managers have indicated that they feel that the most significant threat to the integrity and security of their systems comes from malicious abuse and misuse by authorized persons inside the organization. These statistics demonstrate that effective security solutions must address the issue of protecting systems from insiders and others that are authorized to be using the systems as well as against determined attacks from trained and knowledgeable attackers.

Firewalls, by limiting access to host systems and services, provide a necessary line of perimeter defense against attack. Firewalls do not, however, adequately reduce the risk for applications that generate active content or implement transaction-oriented services. As the term implies, a firewall restricts overall access from a hostile environment (the Internet) to a friendly environment (the local company network). The new paradigm of transaction-based Internet services makes these "perimeter" defenses less effective as the boundaries between friendly and unfriendly environments blur.

A firewall controls broad access to all networks and resources that lie "inside" it. Once packets from a user have traversed the firewall and been authorized to enter the internal network, the firewall cannot prevent access to or modification of specific resources, in the worst case, the system security data itself. For Internet-based transaction systems, the security mechanisms must be able to provide or deny access to particular web pages, applications, and databases on the basis of individual user profiles.

Session encryption and communication security can protect customer privacy while information is in transit, but they cannot protect data residing on commercial transaction servers. Once it has been transmitted and decrypted, the same information that was protected en route is made vulnerable to attack while stored on the server.

Likewise, encryption keys remain open to compromise while they are stored on Internet servers. Consider a system in which encryption keys are machine-generated 64-character strings. Cracking such encryption may seem a daunting task, but if a user can access the file on a system where these strings (or the random-number algorithms used to generate them) reside, the encryption scheme fails entirely.

The same is true of user authentication mechanisms. Once malicious users crack the perimeter defenses, they can get the keys and trick the authentication system into accepting their false identities, and the system and all its resources are rendered defenseless.

Intrusion detection is a tool for responding to attacks on a system. It relies on the system's ability to detect known patterns of activity associated with malicious intent. By definition, such a detection system is unable to deal with new exploits. For example, an attack that uses apparently innocuous packets to exploit previously unknown system bugs in the server will probably go unnoticed. Intrusion detection mechanisms are purely reactive; they do nothing to prevent the initial breach from occurring. Once a security hole has been exploited, application and operating system files are open to subversion, allowing an attacker to open other, undetected, security holes. Furthermore, attackers who successfully gain unfettered access to system audit trails can often delete system traces of their intrusion, effectively rendering the intrusion detection mechanism useless in the most severe cases of attack.

Most IS and corporate managers, already hard-pressed to maintain daily systems operations, face significant barriers to incorporating new technologies and adequate systems security. Managers seeking to upgrade security on their systems are thus often forced to rely on vendor claims of security performance. As new software emerges and inevitable upgrades to existing software pour in, IS professionals typically assume that the vendors have a vested interest in the security of their products. Given the potential implications of security system failure, it is critical that managers concentrate on security solutions that have undergone independent evaluation, testing, and certification.

Trusted operating systems undergo evaluation of their overall design, verification of the integrity and reliability of their source code, and systematic, independent penetration evaluation. One of the most highly respected evaluation tools is the Information Technology Security Evaluation Criteria (ITSEC), an internationally recognized set of standards for the evaluation, testing, and certification of IT security products. ITSEC certification, performed by an independent body, provides the end user with confidence that the claims made about the security functionality of a product are valid. In addition, this certification indicates that these claims have been tested against a predetermined level of assurance and that the vendor has a high level of expertise and a strong commitment to security.

What is desired therefore is a system where these components are fully integrated to provide a secure platform for network services, where users can install the system and immediately begin taking advantage of its security features, installing applications and servers into protected partitions. Rather than requiring administrators to replace the operating system altogether (as with all other prior art trusted operating systems), the trusted operating system of the desired system should have enhancements that are installed as a system upgrade. This maintains 100% compatibility with the underlying operating system API, drastically reducing the costly and time-consuming integration work typically associated with systems of this type.

It is an object of the present invention to provide a secure operating system for use on a firewall or information server where the access is strictly controlled and where the processing is restricted to permit only those actions required to respond to the request. It is another object of the invention to provide a server system where the administrative processes are controlled and executed for a local machine only, such that network users cannot access or modify the administrative functions of the system from outside the local network. It is an object of the present invention that the authorization of a user to request data from the system is compared to a role established for the user making the request. It is an object of the present invention that the request by a user may only initiate predefined processes where the authorization to perform a process is verified at each process step, and where the process does not inherit rights or pass rights to other subsequent processes. It is another object of the present invention that requests for the same item by different users may result in the users being routed to different locations where they are returned different results. It is another object of the present invention that file permissions are modified such that extended attributes are assigned to each file and executable process where these attributes are subsequently examined whenever a request is received by the system.

It is additionally desirable that a web server may be adapted to work with this operating system where a secured portion of the web server that has been modified to work in this manner, may selectively interoperate with the non-enabled portion of the operating system.

It is another object of the present invention to assign a sensitivity layer based on the IP address of incoming communications. It is another object of the present invention to restrict access to processes and resources available by checking the sensitivity layer prior to allowing access to the resource. It is another object of the present invention to enable a web user to access secured resources from a second computing resource where the access is limited by the process requested and the authorization level received.

It is another object of the invention where traditional security components such as firewalls and encryption processes are modified to ensure that attacks on a commercial server can be defeated, where the fundamental security layer is moved down to the operating system level, where decisions are made about access to file systems, devices, and processes and where security cannot be bypassed while operating with efficiency and flexibility.

SUMMARY OF THE INVENTION

The present invention does not take the place of traditional security mechanisms such as firewalls or intrusion detection tools; rather, it provides an added layer of security to ensure the integrity of data and applications at all levels of operation. The present invention provides a method of processing requests from a plurality of computing devices at a trusted server comprising the steps of: receiving an incoming request for a data object; assigning a sensitivity label to an incoming request for a data object; reading extended attributes at a first storage destination associated with the data object; redirecting the incoming request to a second storage destination for the data object based on the combination of the sensitivity label and the extended attributes; executing an action associated with the redirected request.

A method is additionally provided for assigning control and access attributes to data objects for a commercial software product executing on a trusted server, where access to the commercial software product is restrictively managed by the trusted server, the trusted server performing the steps of: executing the commercial software product in a configuration mode; determining at least one process to be accessed by the commercial software product while in the configuration mode; receiving administrator input for a least one sensitivity level to be assigned to the data files and processes; determining extended attributes to be applied to the processes and data files of the commercial software product; applying the determined extended attributes for the received administrator sensitivity level to the processes and data components of the commercial software product; and storing the extended attributes for use in a non-configuration mode.

Following the configuration mode, a method is provided for executing the commercial software product on the trusted server of in a non-configuration mode further comprising the steps of: receiving a request related to the commercial software product at the trusted server comprising a request name, and address indicia; assigning a sensitivity level from the address indicia for the request related with the commercial software product; determining from the request a first location for a process to be executed for the commercial software product; retrieving the applied attributes for the process of the commercial software product stored at the first location; comparing the applied attributes to the assigned sensitivity level for the request; executing the process requested where the process retrieved is correlated to the applied sensitivity level.

The method of controlling access to the processes of a trusted server performs a secondary access check in addition to the owner, world and group access with associated read, write and delete authorization, comprises the steps of: restricting the root authorization of the administrative users of the trusted server such that administrative functions cannot be performed directly; extending the attributes of the file system to include at least a sensitivity level attribute; assigning the sensitivity level attribute to each of the files and processes stored in a storage location in the file system; generating a table of processes of the system where the table contains relationships to the roles of the users permitted to execute the processes; defining user authorizations associated with the roles; establishing a hierarchy of processes related to a task to be performed by the system in response to a user request; defining alternate destinations where files and processes may be retrieved from the storage location in response to a user request; receiving an incoming request for a data object; assigning a sensitivity label to an incoming request for a data object; determining a first destination associated with the incoming request for the data object; reading extended attributes at the first destination associated with the data object; and redirecting the incoming request to an alternate destination for the data object based on the combination of the sensitivity label of the incoming request and the extended attributes. The method further comprises generating the output requested which may ultimately comprise another process request that is handled in the same manner or sending output to the requester.

A trusted server computing system is provided for permitting controlled execution of processes in response to a request comprises: storage means for storing a plurality of data objects with extended attributes in at least one data partition; processor means for receiving requests and executing processes in response to the user requests; assignment means for assigning a sensitivity level associated with the request for a data object; upgrade downgrade enforcer means for interpreting the request to determine a first destination to direct processor to retrieve the process and extended attributes, the upgrade downgrade enforcer compares the attributes to the assigned sensitivity level, and passes the favorably compared processes to the processor for execution; the processor identifies processes that require access to secured storage partitions and directs these processes along with the sensitivity level to a security gate means; the security gate means receives the sensitivity level and interprets processes requiring data from partitioned storage locations, and the security gate means retrieves the requested data if the data sensitivity level is favorably compared to the received sensitivity level.

BRIEF DESCRIPTION OF THE DRAWING

FIG. 4 is a table of the inode structure with sample data for processes packets and files;

FIG. 10 is a sample table for SLs and compartments;

DETAILED DESCRIPTION OF THE PREFERRED EMBODIMENT

Figure 1:
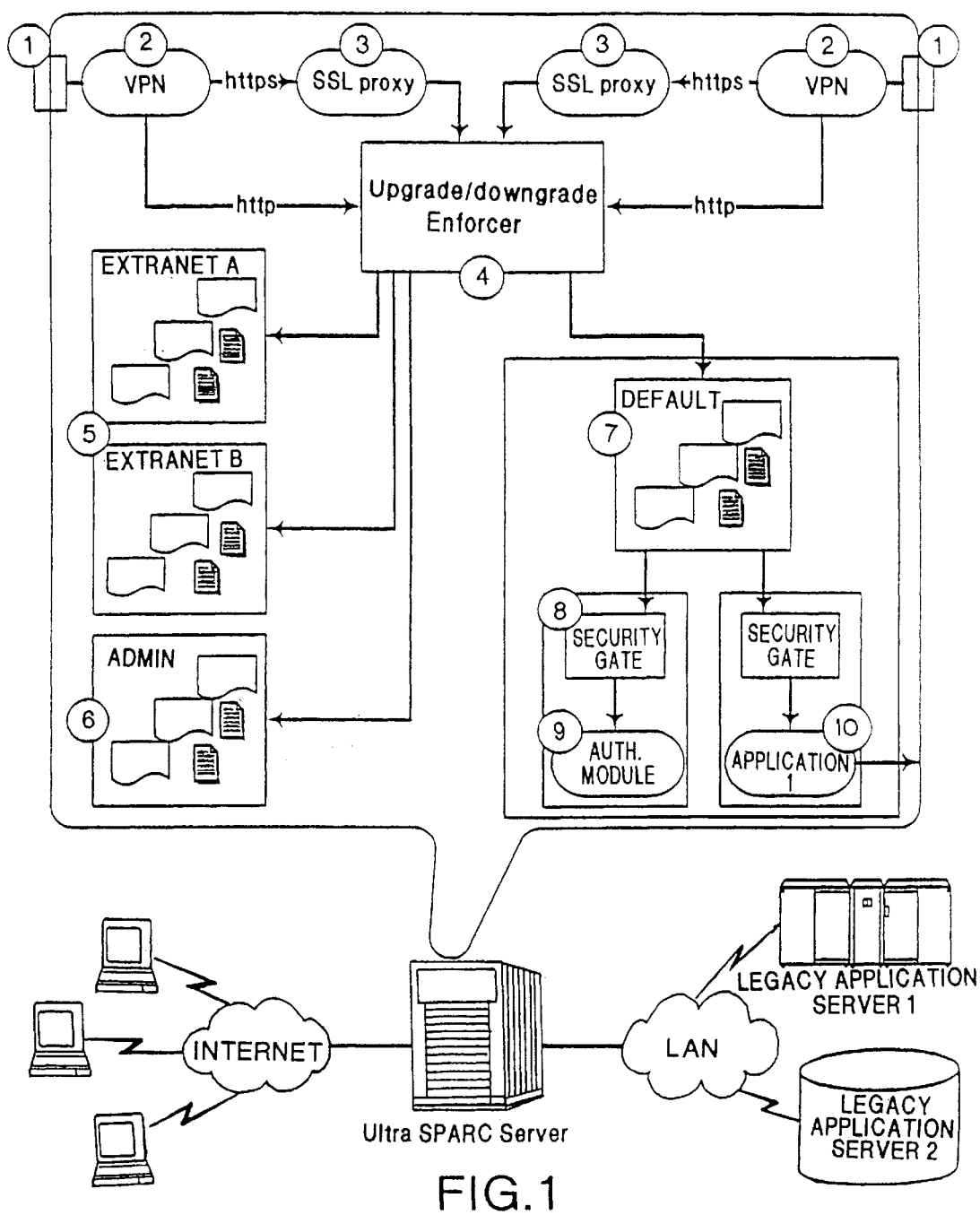
FIG. 1 is an architectural overview of the system of the present invention.

The present invention is a fully integrated software foundation for secure business processes. It incorporates a variety of security technologies into a seamless, secure system. Its components and modifications comprise: operating system security enhancements, network packet management modifications, upgrade/downgrade enforcer (UDE), security gate, trusted administration utilities, enhanced secure shell (enhanced SSH), authentication module, secure CGI module, network layer encryption (VPN), and usage of Secure Socket Layer encryption (SSL).

The following glossary is useful in conjunction with the description of the preferred embodiment herein:

Advanced Secure Networking (ASN):
A security component associated with the network interface which assigns a label to each incoming packet to indicate which compartment or partition the packet belongs to.

Audit trail:
A set of records that collectively provide documentary evidence of processing. The audit trail enables tracing of events forward from the original transactions to related records and reports, and backward from records and reports to their component source transactions.

Authenticate:
To establish the validity of a claimed identity.

Certification:
The approval/accreditation process that technically evaluates a system's features in order to establish the extent to which a particular computer system's design and implementation meet a set of specified security requirements.

Common Gateway Interface (CGI):
A protocol specifying how programs running on a web server are to communicate with web clients.

Compartment:
The portion of the system controlled by the operating system that requires specific access codes to be correlated prior to approving access also referred to as a partition.

Data integrity:
The condition in which computerized data is the same as that in the source documents and has not been exposed to accidental or malicious alteration or destruction. Discretionary Access Control (DAC): A means of restricting access to objects based on the identity of subjects and the groups to which they belong. The controls are considered discretionary because a subject that has certain access permission can pass that permission (perhaps indirectly) on to another subject (unless restrained by Mandatory Access Control).

Hypertext Markup Language (HTML):
An SGML-based standard for applying structure to text. HTML is the markup method used for the majority of documents on the web.

Internet Protocol (IP):
A standard specifying how devices connected over the Internet to uniquely identify themselves and communicate with one another.

ITSEC (Information Technology Security Evaluation Criteria):
An internationally recognized set of standards for the evaluation, testing, and certification of information technology security products.

Least privilege:
The principle that each subject in a system must be granted no more privileges (no higher clearance) than needed for the performance of authorized tasks. The application of this principle limits the damage that can result from accident, error, or unauthorized use.

Mandatory Access Control (MAC):
A means of restricting access to objects based on the sensitivity (as represented by a label) of the information contained in the objects and the formal authorization (i.e., clearance) given to the particular request to access information of such sensitivity.

Multilevel secure:
A class of system that permits access to various sets of information with different sensitivities by users with the correct specific security clearances and needs to know, but that prevents users from obtaining access to information for which they lack authorization.

Packet labeling:
The process of attaching information associated with the permission level of the requesting process to an incoming or outgoing datagram.

Secure Socket Layer (SSL):
A mechanism for providing session layer encryption for a web user.

Security gate (SG):
A software component that allows limited, secure communication between applications or utilities operating in separate partitions.

Sensitivity label (SL):
A piece of information that represents the security level of a request and that describes the sensitivity (e.g., classification) of the data in the object. Sensitivity labels are used as the basis for Mandatory Access Control decisions.

Systems Network Architecture (SNA):
A specific network hardware configuration.

Trusted computer system:
A system employing sufficient hardware and software integrity measures that it can be relied upon to process sensitive or classified information without fear of denial of service, data theft, or corruption resulting from hostile activity.

Uniform Resource Locator (URL):
An addressing system used on the web for identifying the location of and protocol to be used in retrieving a given object.

Upgrade/downgrade enforcer (UDE):
A component of the present invention whose function is to examine each incoming request and decide which application (such as a web server) should handle it.

The trusted server of the present invention as shown in FIG. 1 requires that modifications to the operating system are incorporated such that the operation of key components are affected. The key components discussed below for the trusted operating system are as follows: 1) processes; 2) file system objects (including devices, directories, files, etc.); and 3) interprocess communication messages (including packets, shared memory, etc.). On a standard system, each of these has various security attributes, which are created, managed, and used by the OS itself. When a process attempts to access a file system object, the OS compares various attributes of the process with attributes of the object, and allows or denies access. When a process sends or receives communication messages, the OS verifies that the process is allowed to send and/or receive the message. When objects are created, such as when a file is created or when a message is generated, the OS is responsible for ensuring that the proper attributes are attached to the new object.

Figure 2:
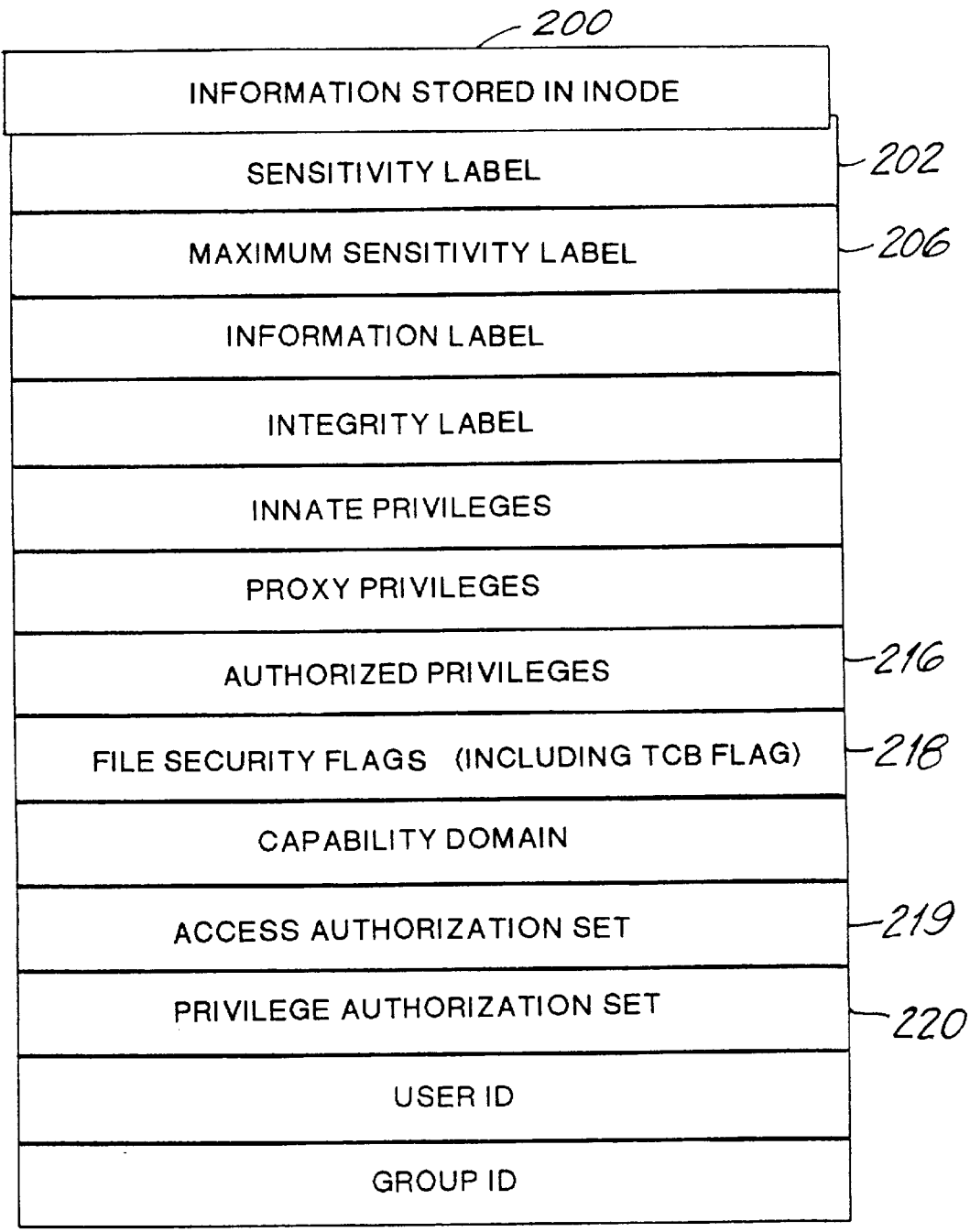
FIG. 2 is a sample inode structure for files of the system.
Figure 3:
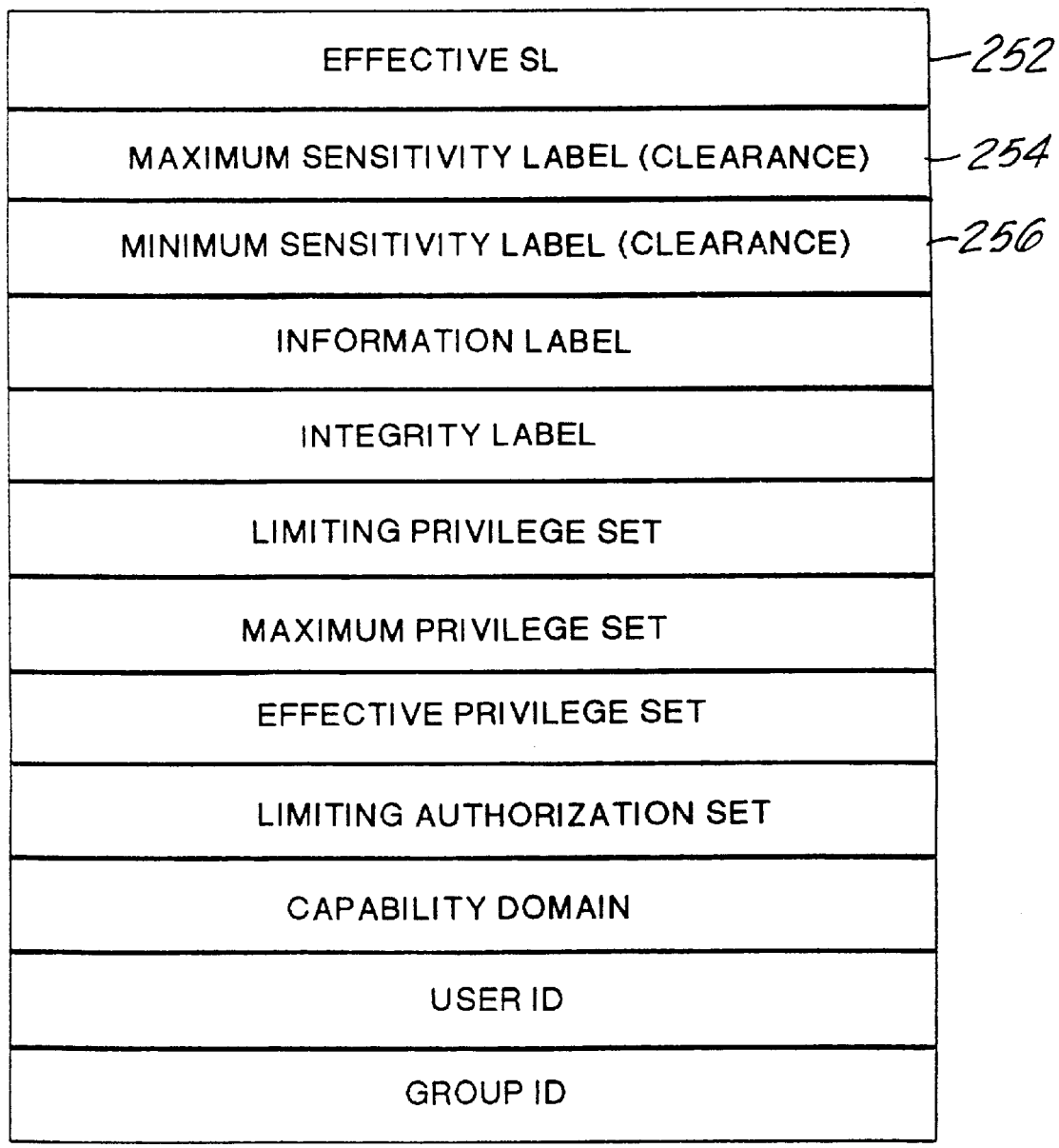
FIG. 3 is a sample inode structure for processes and packets of the trusted server system.

The trusted server system has extended this standard mechanism in two ways: by attaching additional security attributes to each of the OS components, and by extending the security checks to use the new attributes. A security attribute that has been added to all three types of components is the "sensitivity label" 202 or SL. FIG. 2 shows the extended attributes applied to files while FIG. 3 shows the attributes that are applied to the processes or packets that are processed on the system. FIG. 4 shows the attribute types in a tabular form that are part of this structure. Unlike standard security mechanisms, the SL 202 is designed to be mandatory, i.e., not under the control of the user. This means that though a user may own a file, he would be unable to make it, or its contents or even a copy, accessible to a user that was not previously authorized to have such information. SLs can be related in several ways: 1) they can be equal, 2) one can be "greater" (dominates) than another, and 3) they can be "disjoint" (meaning neither is greater than the other). A simple analogy may help explain the SL relationships. In a large organization with many divisions and levels of management, there will be a hierarchy of managers. Many times one employee can be described as being "above" or "below" another in the hierarchy. However, a supervisor from one division may have no authority over a worker in a separate division, such that neither can give tasks to the other. In fact, the lowest member of one department, such as the accounting department, may have access to some information that is denied to a senior manager in another department.

A process is the instance of a running program, that is, a computer program that has been written and stored into a file and which is seen by the system to be "executable". Often a computer program is written so that at some stage it will "call" or "execute" another program, such as when a network browser program starts running a word processor program or a modem software package. When a process makes this request, the OS compares the attributes of the process to the attributes of the file where the program is stored to see if the process will be allowed to run the program. The additional security attributes of the trusted server system are used by the OS to allow greater control over which programs are available. In addition to the standard user and group identifiers, the trusted server system has added an "authorization database" in the OS that is used to see if the user running the process can access or execute the requested program.

On any system, some programs need to be able to bypass some of the security to get certain jobs done. For instance, in order to create a backup of the system, an administrator has to be able to run a program to read every file and write each onto a tape or disk, even though the administrator may not normally have access to all files. Under these circumstances, the process's "privilege" attributes are used to allow it to bypass specific security mechanisms. Privileges can be stored on a program's executable file so that when the program is run, the process running it will have the special capabilities it needs (these privileges are called "innate privileges" on the present system).

In addition to traditional authorizations and privileges, the trusted server system has added the concept of adding at least one set of privileges to a program file in addition to its innate privilege set, along with an additional list of authorizations, called the "privilege authorization set" 220.

When a program is executed, the process will be given both the innate privileges and the "authorized privileges" if the user running the program has one or more of the privilege authorizations. This allows the administrator to set up programs so that users are not just allowed or denied access to the programs, but also so that some users will run the program with a greater ability to bypass certain security restrictions. Since this mechanism is applied to the copy of the program file stored on the disk, not to the program itself, this can be added to commercial, binary copies of software for which there is no access to the source code.

The trusted server of the trusted server system has added a minimum 254 and maximum clearance (SL) 256 for each process. This additional attribute is used to limit certain privileges. For other systems using a privilege mechanism and providing SLs, the privilege to ignore the SL checks cannot be limited to a specified range. Thus if a special program needs to be able to operate using multiple SLs, it is given a privilege that tells the system to override all SL checks. By providing the clearance range 254,256 and by adding checks to limit the scope of the SL override privilege, the trusted system can allow a site to run many special programs, each having the ability to handle special "multi-level operations", and yet each still being isolated from the others.

When a process sends information via a communications channel or network, the trusted server has modified the OS so that the process's security attributes are attached to the packet. If the communication is with another process on the same machine, the security attributes can be checked before the destination process is given access to the packets. Thus the OS can enforce security on processes based on various security attributes, such as SLs. When a packet is sent out on a network interface, the trusted server allows the security information to be embedded in the network packet so that the receiving system can properly set up the packet when it arrives, and then properly check security before allowing a process to access the packet. When a packet arrives from the network without security information embedded in it, or if the trusted server system is configured to ignore any embedded information, the system adds default security attributes based on an internal table that is configured by the system administrator. In the prior art, such tables used the source host IP address and the network interface from which the packet arrived to determine the set of default security attributes. The trusted server has added to that the ability to use port numbers (which specify various network services such as HTTP, FTP, telnet, etc.) and/or protocol (e.g., TCP or UDP) along with the interface, source network/subnet, and source IP address. In addition, trusted server has allowed the administrator to have separate rules for packets leaving the system and packets coming into the system. These rules are used not only to provide default information for incoming, unlabeled packets, but also for determining if a packet should be allowed out or in on a specific network interface or to a specific host or network. The processes or components of this system may be implemented using software components, or may alternatively utilize microprocessors having embedded processes.

In the preferred embodiment of the Unix implementation, the trusted server system comprises a computer executing the kernel process of the present invention where in addition to the default inode structure information, a link is included to retrieve previously stored attribute label information related to the file. In another embodiment, the inode structure is modified to permit the direct inclusion of the label information such that it is accessible to the processing routines of the system of the present invention without looking at other information stored in a different portion (partition) of storage. The kernel is adapted to retrieve this label information whenever a process calls a file from storage. This label may enable the processor to retrieve the file stored at that reference location directly if the user's base authority and permissions permit the execution of the file and if the extended attributes in the system authorizes the user to access that level of information. The system comprises storage means to store the process and authorization relationships, processor means for interpreting requests received whether from the local processor or from remote users that comprises an upgrade/downgrade enforcer to determine accessibility to resources and to direct user requests for data to an appropriate location and a security gate to restrict and check for proper communications between legacy applications and the requesting process.

Referring to FIG. 1 and the process diagram, when a packet arrives at a network interface 1, the Advanced Secure Networking (ASN) component assigns it a label to indicate which compartment it belongs to where the compartment is indicative of the data accessible via that IP address. The label will be assigned based on either the interface or the source host address. Host addresses are never trusted unless the packet can be authenticated using network layer encryption. The assigned label will be used by the upgrade/downgrade enforcer 4 to establish how the packet will be protected and to determine the appropriate end destination.

The role of the UDE 4 is to examine each incoming request and redirect it to the appropriate service. The UDE is a tightly integrated trusted program that, unlike the other processes and programs, can pass packets between different security partitions. The UDE looks at three factors in making its decision: the ASN applied packet label (based on the IP address and/or network interface), the requested URL, and any "user authentication cookie" that may be present due to a successful authentication attempt by the user authentication module.

A Security Gate 8 (see FIG. 1) program is a special program that allows limited communication between two processes, or between a process and a network interface. Its configuration file specifies the source SL and port, along with the destination SL and port. In a typical configuration, the source and destination SLs are disjoint, meaning that the two ends cannot interact in any way. The Security Gate program is given an SL that is greater than both. It is also given an SL range that includes both endpoints, along with the privilege to override the SL security checks, but limited to only the SLs within its range.

The UDE (Upgrade/Downgrade Enforcer) program is more sophisticated than the Security Gate. It allows an incoming packet (which has been assigned security attributes as it arrived to the system) to be routed to another port, possibly with its SL being modified. The UDE uses a configuration file and a file of "rules" to determine what accesses are allowed. The UDE can pass HTTP traffic or other protocols. If HTTP traffic arrives, the UDE can examine the packet for 1) the presence of a "cookie" in the header, 2) the URL path specified, 3) destination port, and 4) the SL of the packet. Based on this information and on the rule database, the UDE can select a new SL for the packet, as well as a new port number and network address. Multiple copies of the UDE can be running on a single system. The UDE has the privileges it needs to be able to change the SL of traffic flowing through it.

An additional security mechanism provided by the trusted server is the TCB 218 (trusted computing base) mechanism. The trusted server has taken the existing concept of being in "multiuser" or "single user" mode and extended it into the OS itself. On a standard UNIX system, the difference between these modes is merely which services (system processes) are running. Switching between modes is merely a matter of stopping or starting processes. On the trusted server system, the standard primary system process (called "init") has been modified to change an internal OS flag 218 to indicate that the system is either in operational (secured) or maintenance (less secure) mode. An additional flag is added to each file system object's inode to allow that object to be considered a "TCB object", meaning that it cannot be modified or opened for READ if the system is in operational mode.

In addition, the trusted server system allows various security mechanisms (such as the SL mechanism) to be turned off or on, depending on the system mode. The system administrator can thus choose to define what security mechanism are in force in each mode.

The trusted server system of the present invention will be described with respect to the Unix operating system. Other operating systems may also utilize the security aspects of this invention to provide a secure mode of operation for any type of computing device such as workstations, mainframes, personal computers, computing enabled devices, and wireless communication devices. The operating system of the present invention preferably has a foundation based upon the Unix operating system where the system may be executed in either an administrative mode or in a secured operation mode and where the file storage structure and processes executed are modified to permit a highly secure method of managing content on the computer system.

The term data object is used to generically describe any content upon which a process is to be performed, and it may additionally be applied to the process itself such that parameters of an event to be executed are checked prior to the execution of that process step. This system may be implemented where each event to be performed is handled by one central event controller that comprises each of the aforementioned components (ASN, UDE, Security Gate) or alternatively each of the components may be separately executed such that they operate in a cooperative manner. The trusted operating system of the present invention supports SLs and uses them to determine if a user or process can access certain objects or resources. Since SLs cannot be modified by users or unprivileged processes, a system's security policy can be enforced without relying on user compliance. This access control using system-enforced labels is called mandatory access control (MAC).

Other restrictions implemented to secure the operating system of the present invention require the segmentation of the superuser (root) privilege, where the root account is not permitted to execute all of the processes associated with system administration. Instead this privilege is broken down into many smaller privileges. Thus the backup program may be able to read any file, but it cannot be exploited to shut down the system, modify files, or send random network packets. The use of many limited capabilities instead of a single all-powerful mechanism is called in the prior art, the least privilege principle.

On the trusted operating system of the present invention, programs, not users, are given privileges. The backup program will have only the privileges it needs to do its job, and any program that it starts will not inherit the backup program's privileges. A specific user may have the right to run certain programs, but the user's session is in no way privileged. The programs with privileges are few, have limited power, and are carefully controlled. The use of least privilege eliminates most of the security problems commonly reported with standard operating systems. Even if a specific superuser bug may go unfixed, on this trusted operating system exploitation of the bug will not allow a malicious user to bypass all system security.

Figure 5:
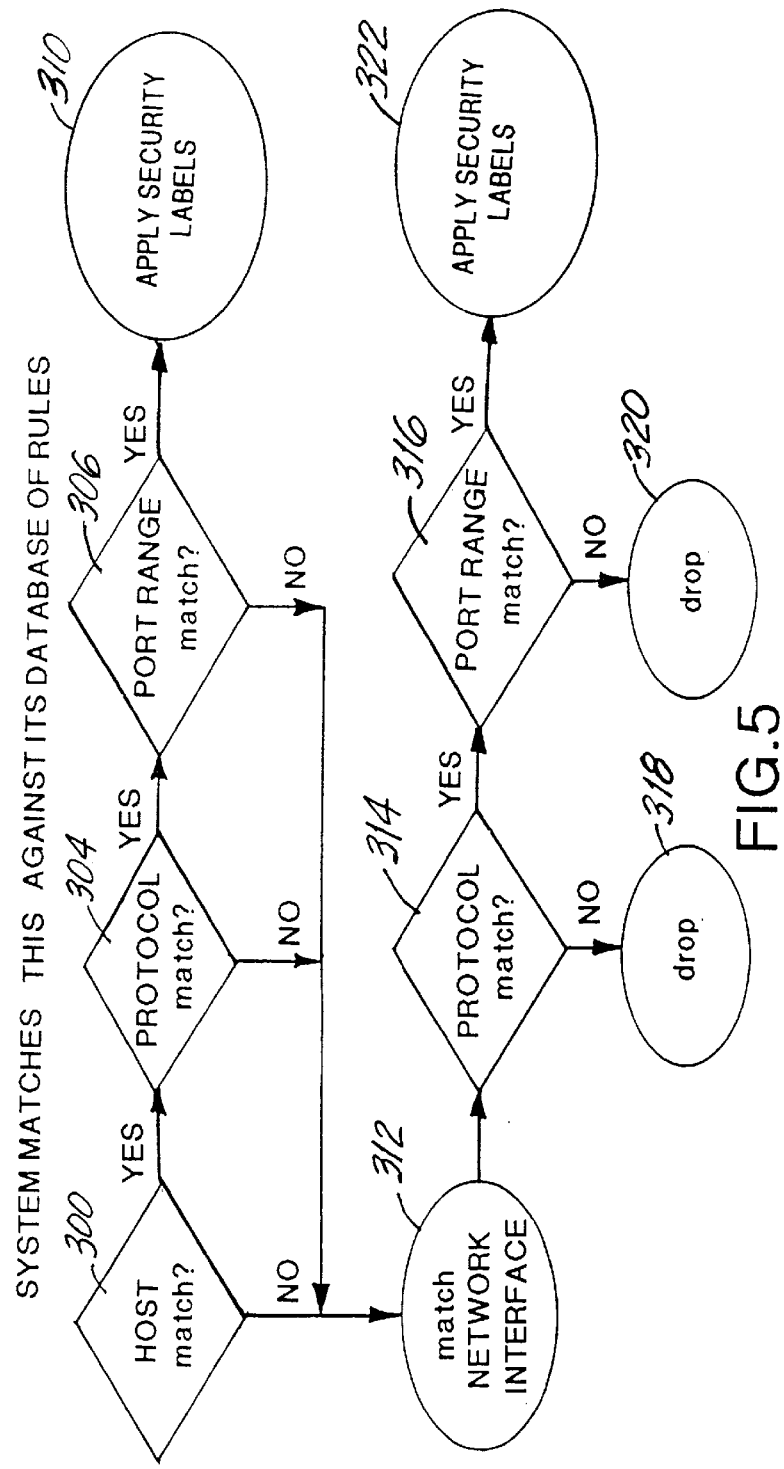
FIG. 5 is a flow diagram for incoming packets.

On this trusted operating system, labeling and MAC are applied at the network interface level in addition to on the file and process levels. For example, applications such as web browsers are typically configured to listen to a particular network interface to identify data destined for that application program where the program responds to and generates information that is directed through an Internet network connection. In the present invention, the trusted server does not allow the applications to connect directly to the network services of the machine, instead the UDE interoperates with the network adapters and interfaces directly to act as a front end to the network services for the applications. In this manner, labels, privileges and authorizations may be determined and applied prior to routing the communications to a preferred destination path or to a network service component. For incoming packets from the Internet for example, a label may determined at step 310 based on the host id requested at step 300 (see FIG. 5), the protocol requested at step 304 and the port number at step 306. If no corresponding security label exists for that combination received, a check is performed to determine for a network interface whether a protocol match (at step 314) and port range (at step 316) exist. If a match is found at step 316 the corresponding security label is applied to the packet at step 322. This packet is then routed preliminarily to the UDE where based on the label previously applied, the packet is directed to the corresponding output destination that listeners are configured to listen to. The label may be modified at this time by the UDE to redirect the packet according to a more comprehensive set of rules.

Figure 8:
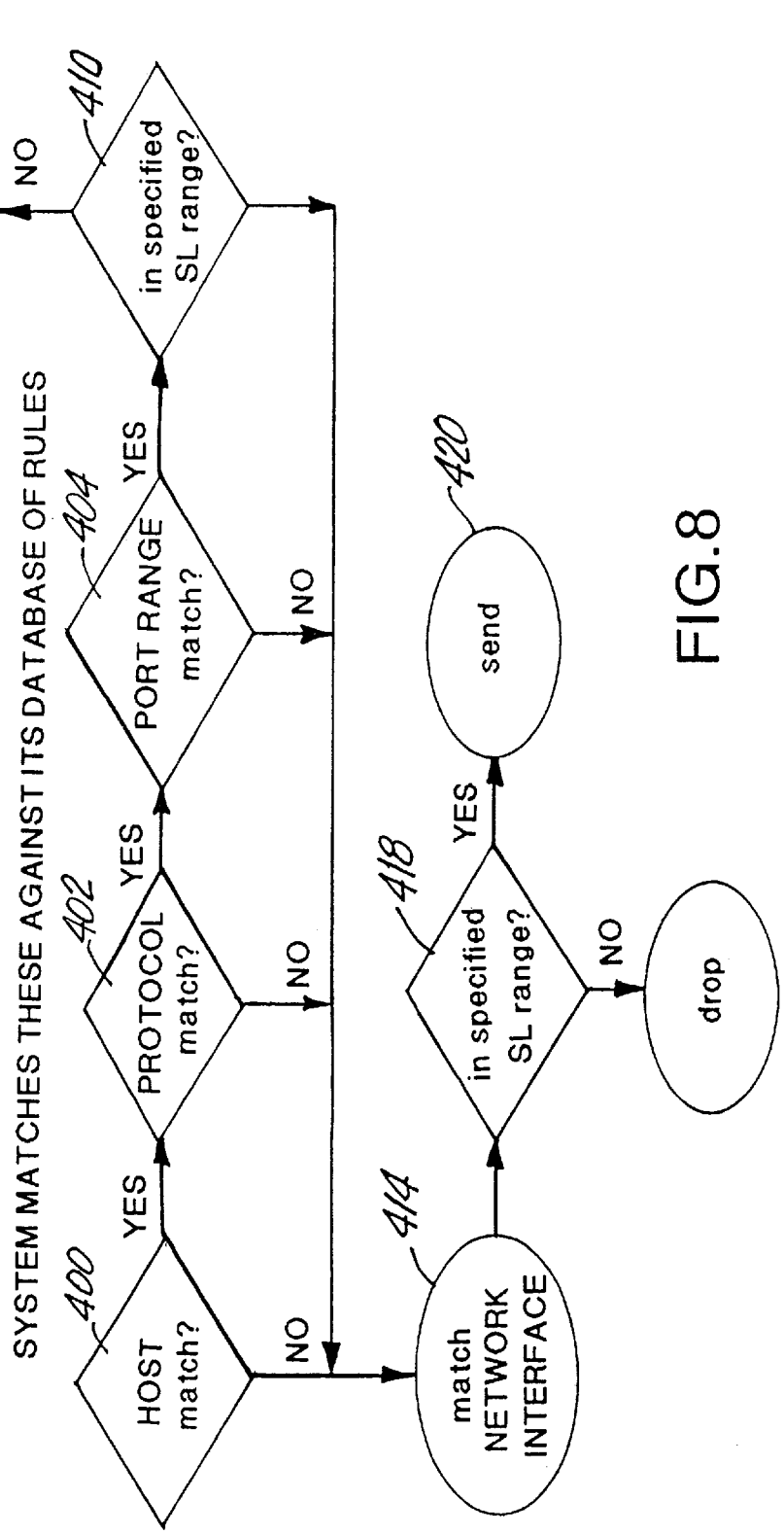
FIG. 8 is a flow diagram for outgoing packets.

FIG. 8 shows a diagram of the processing steps for outgoing packets that uses similar verification steps to either drop the outgoing packet or to allow the packet to be sent if the host (step 400), protocol (step 402), port range (step 404), and SL (step 410) and network interface (step 414) are known to the system. Outgoing packets will have the label of the process or daemon that created them. An incoming or outgoing packet will be dropped if the SL of the packet is not valid for both the interface and the remote host. In addition, the SL can be inserted into the packet header so that trusted operating systems can share security information over the network.

Figure 6:
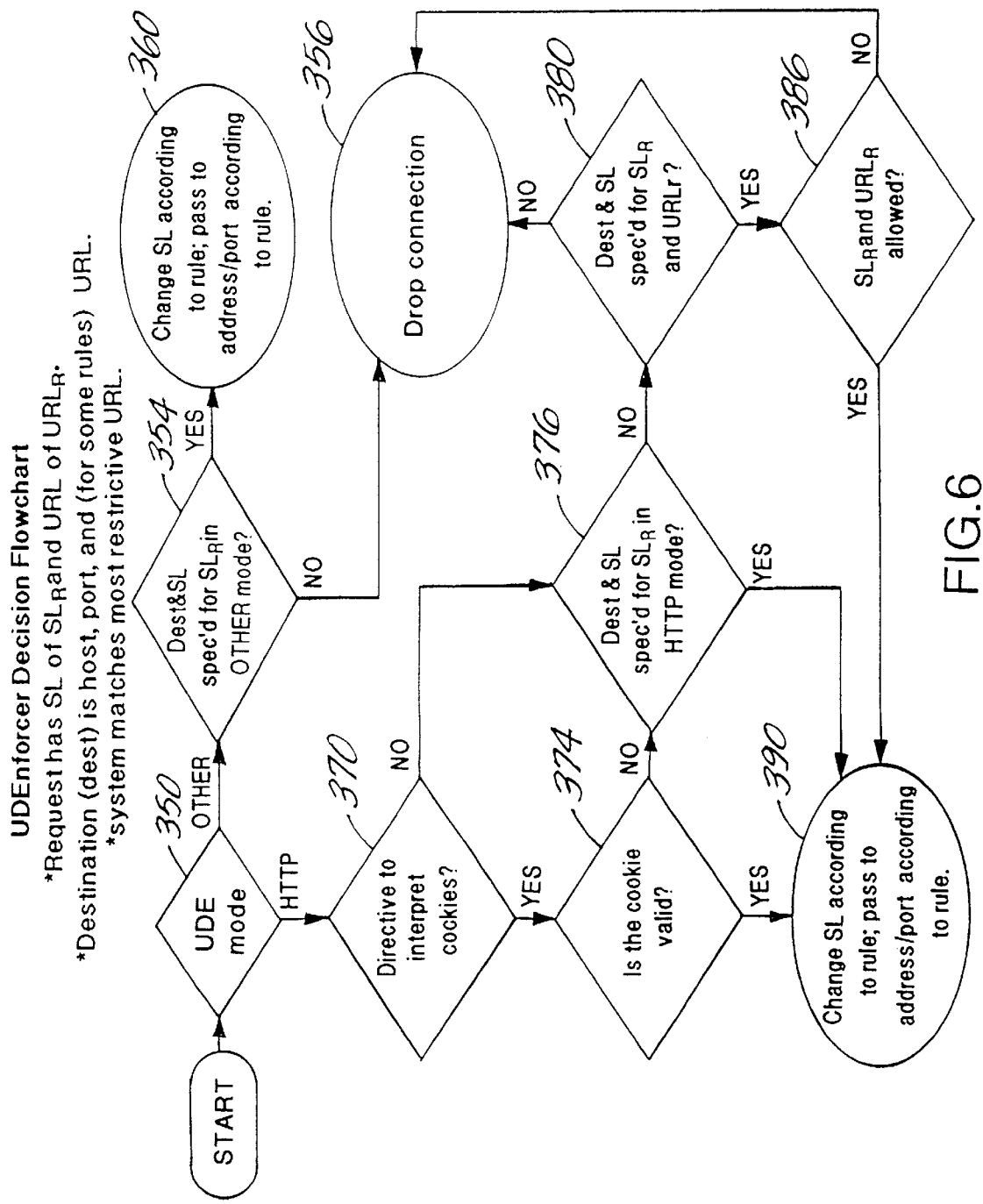
FIG. 6 is a flow diagram for the processing by the UDE of the present invention.

Regarding FIG. 6, based on the type of communication received, the UDE mode is determined at step 350 where URL requests for Internet based communications and Lan or Wan network requests are processed. If a cookie is available at step 370, which specifies known user information recorded during a prior access by the user, the cookie is checked for validity at step 374. If it is found valid the sensitivity label is changed at step 390 according to data stored in a database to direct the user request to the appropriate destination address and port that the listener of the application was configured to listen to. If the cookie did not exist or was invalid, the supplied destination selected and sensitivity label SL, may be determined at this point and if found acceptable the request may be passed to step 390. If still not acceptable, the URL in combination with the sensitivity level may be used to direct the request to an alternate location at step 386 if a suitable destination has been arranged, otherwise the connection is dropped. Communications not using URLs are handled by comparing the destination requested along with the SL to a table of predefined acceptable combinations at step 354, if no suitable combination was found the request is dropped at step 356. If the request had properly matched the SL then the SL could be changed at this point to indicated a revised label and port address where the data is made available to listening applications at step 360.

Figure 7:
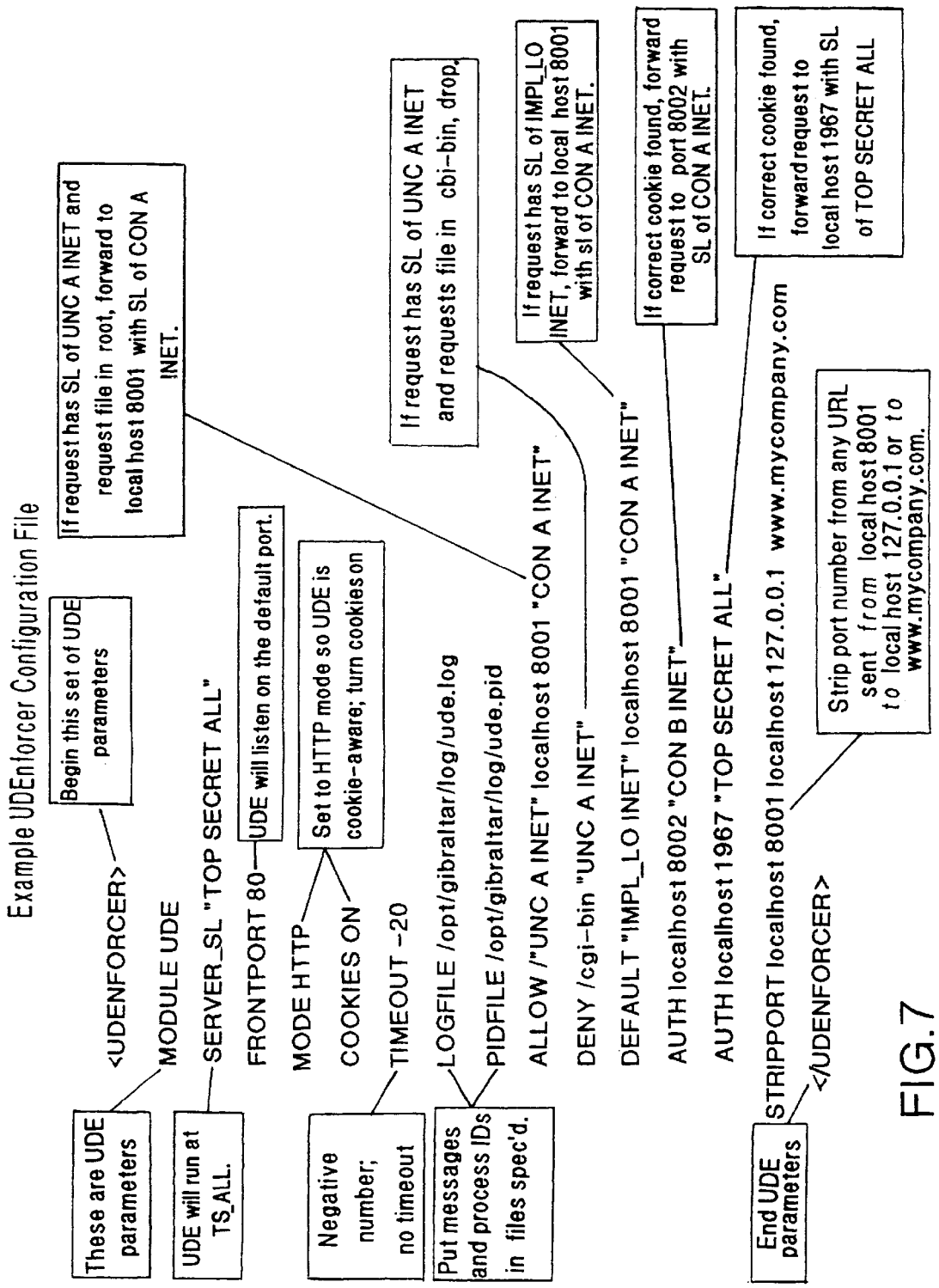
FIG. 7 is a sample configuration file used by the UDE.

FIG. 7 shows an example of a configuration file that is used by the UDE for the routing of requests for different types of data based on the originally applied label. The file contains references to the port where the communication is received and redirects the request according to content of the cookie stored on the user computer.

Figure 9:
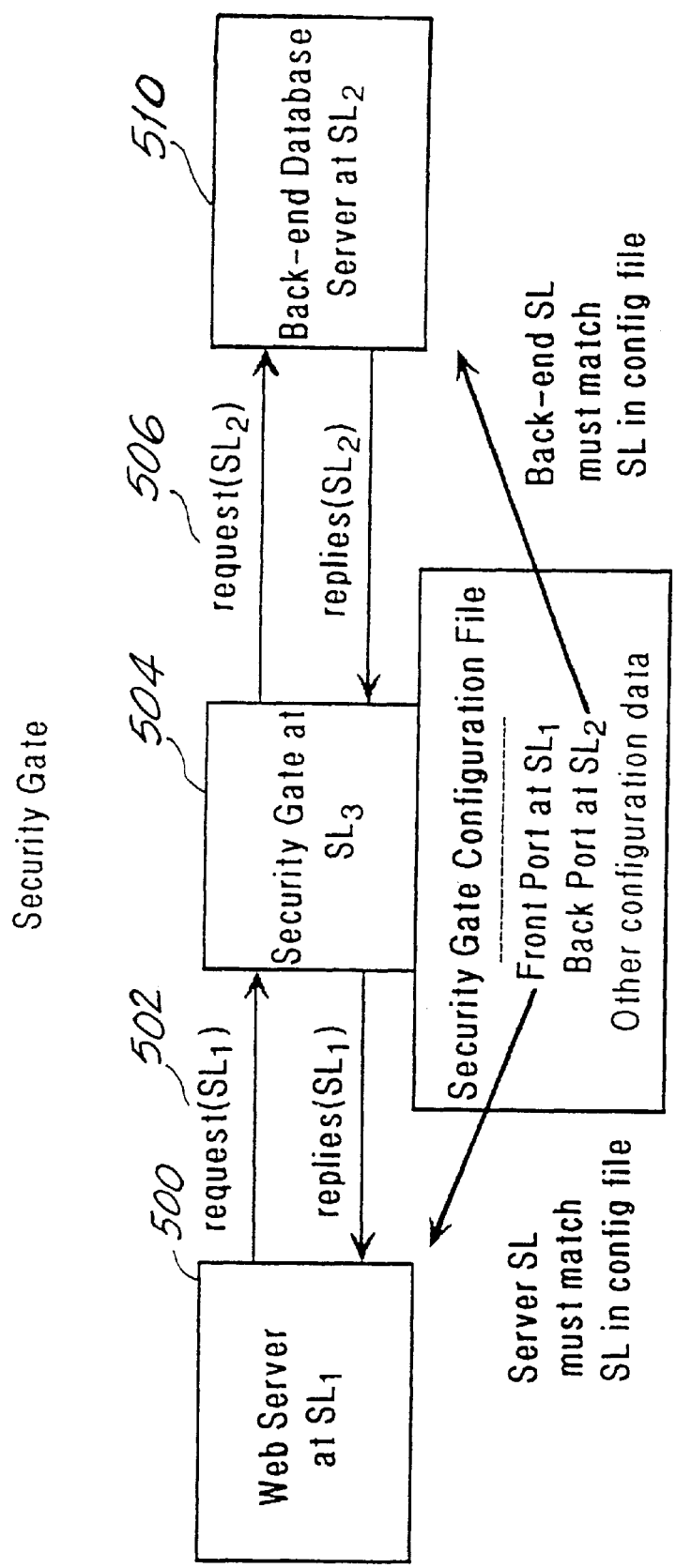
FIG. 9 is a representation of the flow through the Security Gate.

The Security Gate 8 (see FIG. 1) program as previously mentioned is a special program that allows limited communication between two processes, or between a process and a network interface. Its configuration file specifies the source SL and port, along with the destination SL and port. For example, requests that are processed at the web server 500 that need access to other information in secured partitions are handled by the Security Gate 504 (see FIG. 9) where a request 502 at an original SL may be received by the Security Gate 504 that may be operating at a higher SL level. Requests that are authorized may have their SLs modified from $SL_1$ to $SL_2$ in order to conform to the permitted SLs of the Back-end Database Server 510. As previously mentioned in a typical configuration, the source and destination SLs are disjoint, meaning that the two ends cannot interact in any way. The Security Gate 504 program is therefore given an SL that is greater than both. It is also given an SL range that includes both endpoints, along with the privilege to override the SL security checks, but limited to only the SLs within its range. In this manner the data from different partitions or computers of the system may be joined together as required for the purpose of generating data in response to the request. On the path back to the user the Security Gate performs the label translations required to return the replies to the requesting web server 500.

In an example of this system for a Unix operating system, a modified Init kernel is substituted for the standard operating system where the file attributes associated with each of the programs, network resources and executable processes are modified to work with the revised role-based authorization methodology. The functionality afforded by this invention is therefore to extend the verification of process to process communications where each process is compared to the role of the user, and the privileges permitted for the processes.

FIG. 10 is a sample of a simple sensitivity label table showing labels corresponding to various classifications that may be applied that permit access to different compartments or partitions. For example, this table may be used by the security gate to allow requests to be directed to data not directly accessible because it is located in a separate computer or partition of the computer.

Figure 11:
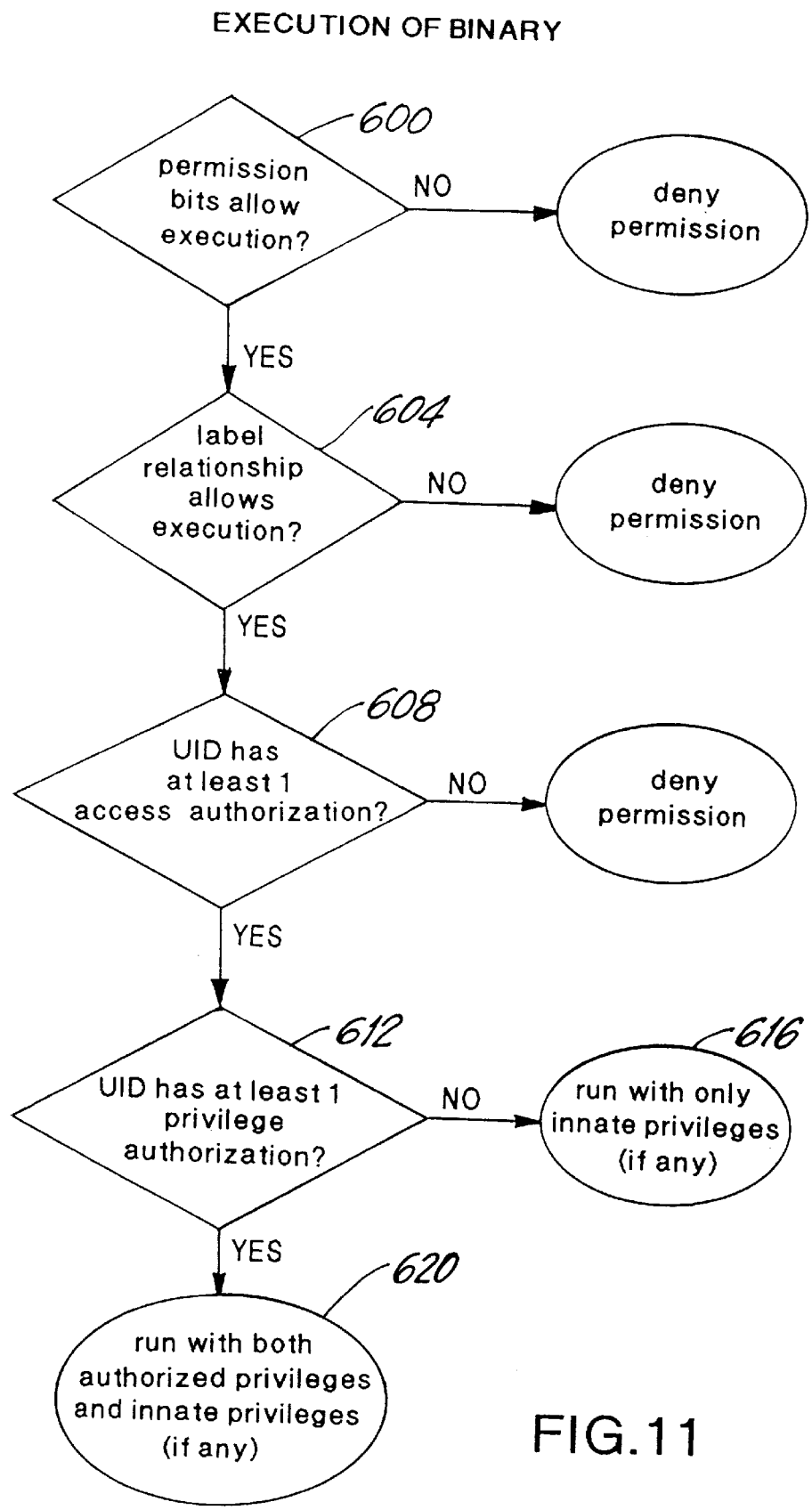
FIG. 11 is a flow diagram of the processing steps for executing binary data.

Regarding FIG. 11 (binary flow), when a process executes a file, the trusted server interrogates both the process and file prior to execution. The security attributes of the process and file are already established, as shown in FIG. 4. (Numerical references in the 200s relate to FIG. 4; those in the 600s relate to FIG. 11.)

The permission bits are checked at step 600, then at step 604 the SL labels are verified to establish that the process SL (272) is equal to or greater than the file SL (292).

In step 608, the process user ID (UID) (262 not shown) is looked up in a database to determine if it has at least one of the accesses listed in the access authorization set (280). (A separate authorization database lists which UIDs have which authorizations.)

If any of the prior verification steps failed, permission to execute the binary program would be denied.

In step 612, the trusted server compares the authorizations associated with the process UID (262) with the privilege authorization set (282). If the process UID (262) has one or more of the authorizations listed in the privilege authorization set (282), then the trusted system executes the binary with privileges listed in the file's innate privileges (286) and authorized privileges (284) at step 620. If the process UID (262) does not have any of the authorizations listed in the privilege authorization set (282), then the trusted system executes the binary with the privileges listed in the file's innate privileges (286), but not those in the privilege authorization set (282) at step 616.

The combination of UID authorizations in the authorization database and privilege sets of the file determine the privileges that are granted process B that results when process A executes a file. A particular process UID (262) for example, may be granted the MAKEIDB authorization in the authorization database. (The MAKEIDB (280) value may refer to a defined role that would permit processes with that authorization to perform certain actions.) If the process UID (262) had the MAKEIDB authorization (280), then when the process executed the file in FIG. 4, the file would execute. If the process UID had neither DEBUG nor MAKEIDB authorization, then that process would not be allowed to execute the file in FIG. 4.

To further the example, if a process's UID had AUDITSYS authorization, then when that process executed the file in Table 4, the resulting process would be granted the file's authorized privileges (284), in this case, PV_PV_FILE. (PV_PV_FILE allows a process to change a file's privileges.) Thus, if any process with a UID that has AUDITSYS authorization executes the file in FIG. 4, the resulting process would have the privilege to change a file's privileges. But if a process whose UID had neither AUDITSYS or BOOT authorization were to execute the file in FIG. 4, the resulting process would not have the privilege to change a file's privileges. These examples are used to demonstrate the functionality afforded by this system and not meant to constrain the potential uses of this methodology.

This system includes a "default web site" 7 for traffic coming from unprivileged hosts or interfaces (see FIG. 1). In order to prevent malicious users from destroying or corrupting the web site, the web pages can be stored in a separate, read-only partition. It thus becomes impossible for a malicious user to exploit holes in commercial web servers or in web applications, such as CGI scripts, to damage the site's web pages. As with the extranet web servers, the UDE 4 and the default web server 7 can be on separate hardware platforms and connected using secure network services.

The authentication module 9 of the trusted server system can be configured to request a user to provide a user ID and a site-definable authentication response (such as a password, a biometric device, a smart card, or an access token check) prior to permitting access. Once the user has been authenticated, subsequent web requests can be identified by the UDE as part of an authenticated session, and communication to other restricted partitions can be allowed.

Figure 16:
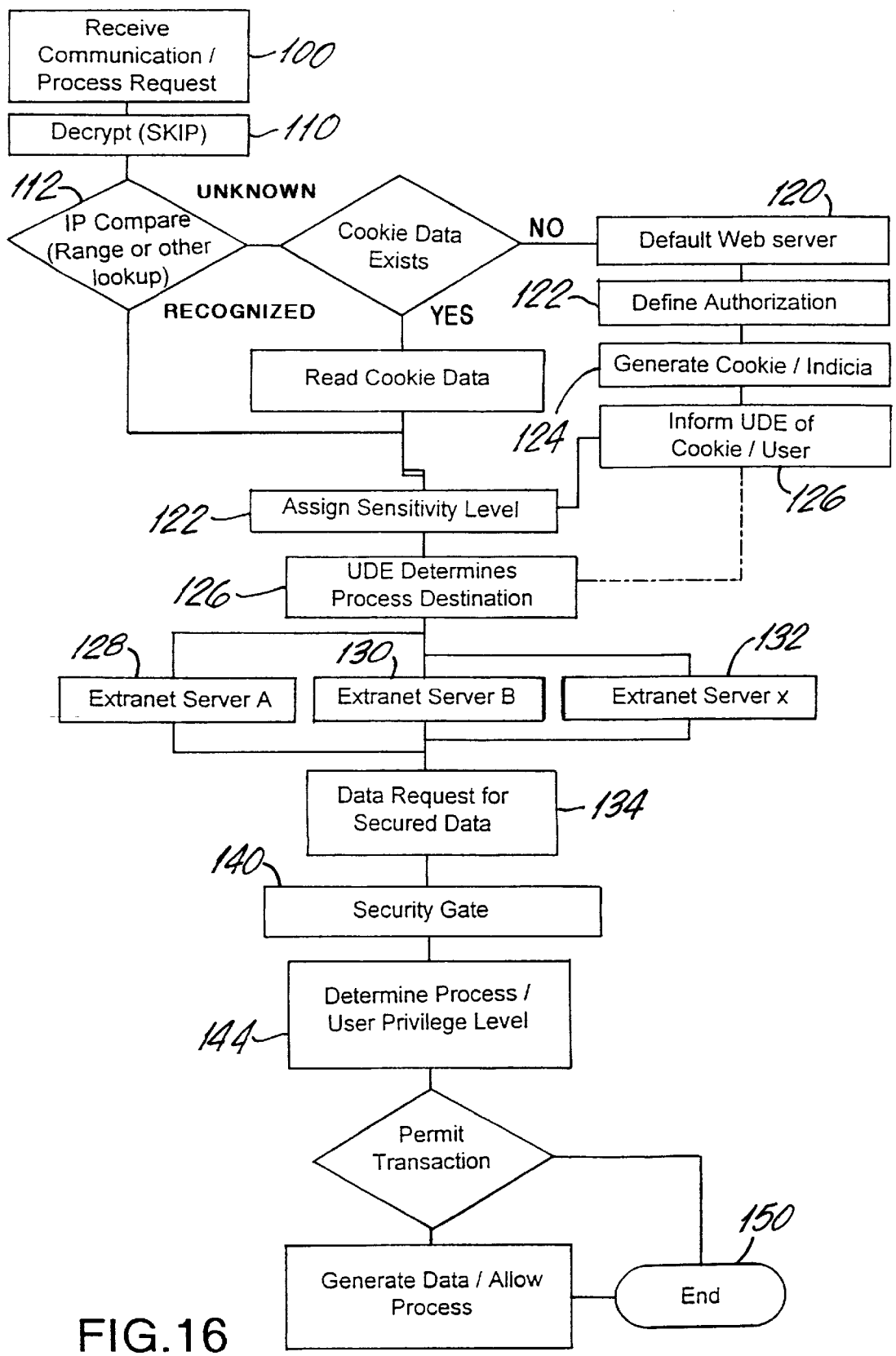
FIG. 16 is a data flow diagram of the processing steps of the present invention.

The data flow in the architecture of FIG. 16 is illustrated here using three examples: an extranet environment, back-end/legacy application support, and use of the authentication component.

Figure 13:
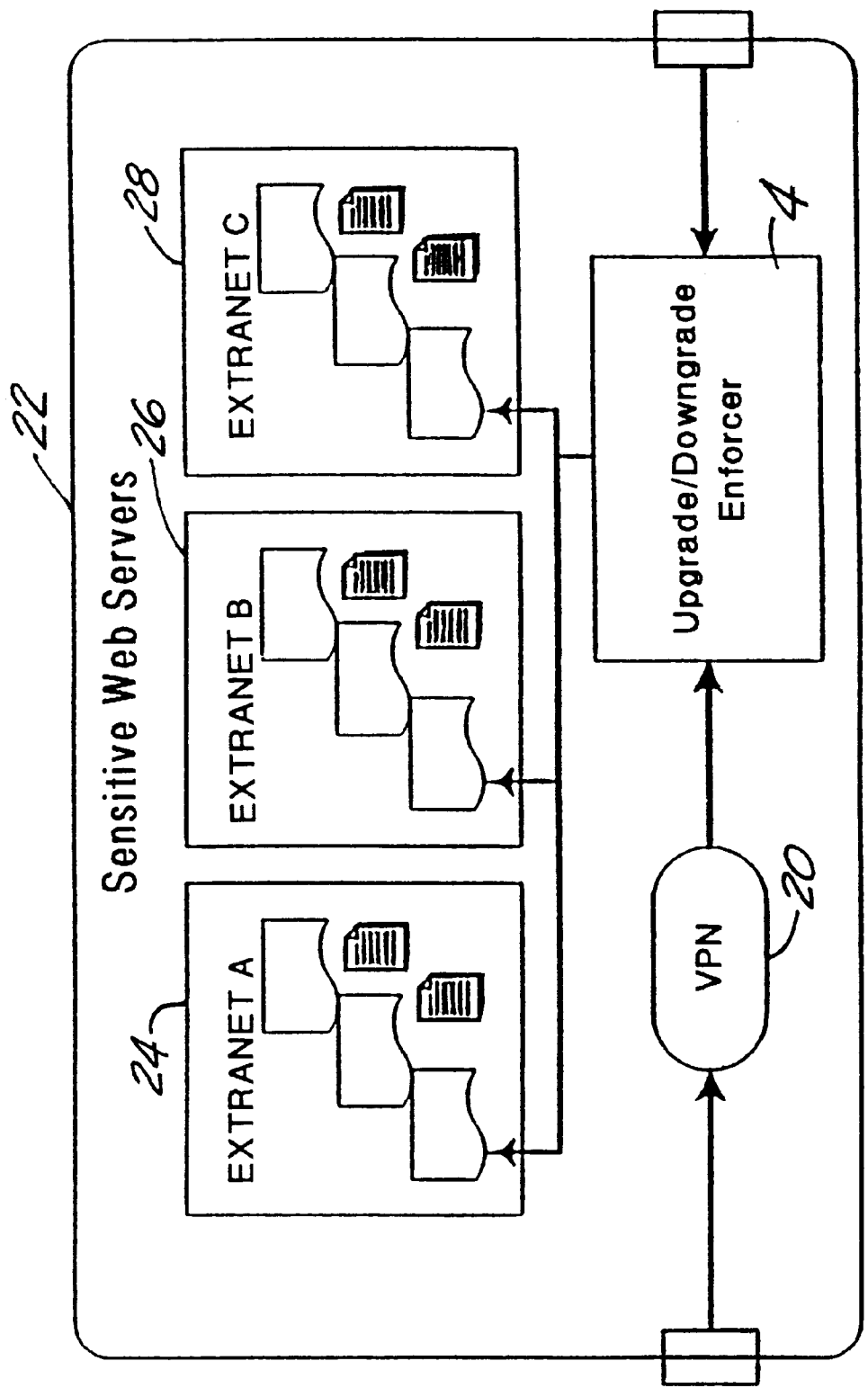
FIG. 13 is a diagram of the components interacting in an extranet access example.

Referring to FIG. 13, the present invention can be configured as an extranet server hosting two or more sensitive web sites that must be isolated from each other. The virtual separation of extranet web servers allows administrators to configure the system so that users accessing it with the same URL will get different web pages. This functionality is transparent to the user.

An example of this configuration is a company web server that can be accessed by employees, customers, shareholders, and others. The sensitivity of information varies for each category, and data protection becomes a critical issue. In this case the secure server is used to provide secure extranet functionality for three web servers (Extranet A, Extranet B, and Extranet C) that are running on the system. The components involved are VPN 20 via SKIP, the upgrade/downgrade enforcer 4, and the trusted server 22.

When a request comes into the system at step 100, it first goes through the encryption module (VPN) 20 at step 110. The encryption module 20 will authenticate the IP address of the request at step 112. A sensitivity label is then assigned to this request based on the IP address at step 130, or a default label is used if the IP address of the request is not a special address recognized by the ASN at step 120 (i.e., if the entry for the IP address is not in the hostrange table) The port is used to determine the ultimate destination and SL assigned as previously disclosed with reference to FIG. 5.

Next the request is passed to the upgrade/downgrade enforcer (UDE) 4 at step 140. The UDE 4 will retrieve the sensitivity label of the request and pass the labeled packet to the corresponding web server. For example, if the incoming request has been assigned the sensitivity label "ExtranetA," the UDE 4 will redirect this request to the Extranet A web server 24 at step 142. The Extranet A web server 24 will accept connections only if they are labeled as "ExtranetA". FIG. 6 describes a more detailed view of the actual steps performed. All other requests will be denied, which prevents direct connections to this web server from the Internet.

Another example is a request from an IP address that has access to two extranet environments: ExtranetA 24 and ExtranetB 26. First the IP address is verified and the network packet is decrypted at step 110. The ASN module will then assign the request a sensitivity label of "ExtranetA, ExtranetB". After the IP address is verified at step 112 and assigned an SL at step 130, the request will be passed to the upgrade/downgrade enforcer (UDE) at step 140. The UDE 4 will parse the URL request and determine which web server should receive it. Then the UDE 4 changes the SL of the request to match that of the destination web server and transmits the request to the appropriate web server (at either step 142 or 144) if the permissions, access authorizations permit the change.

This approach defeats any attempt to directly connect to the extranet servers; access is granted only through the UDE 4. All communication to and from extranet servers is mediated by the UDE. Because the servers operate in isolated environments, any attempt to exploit bugs in the extranet server software cannot compromise any other application on the server.

This system then may be configured to provide secure connectivity between a web interface and a back-end application using the Security Gate. The web server serves the sole purpose of displaying information from a back-end application in a graphical format and is meant to be accessible by a public or a corporate network. For example, a bank may wish to let all of its customers use an Internet banking feature. Because of the threat that some of its customers may be malicious, sensitive data must be protected by separating the web server and the back-end application into separate virtual environments. This system provides a secure way to address these issues. With the security gate 8 component, there is no direct data flow between web server and back-end applications. All requests go through the security gate, which will raise the sensitivity label of a request to the level of a back-end application when required to access data requested and permitted by the system.

Figure 14:
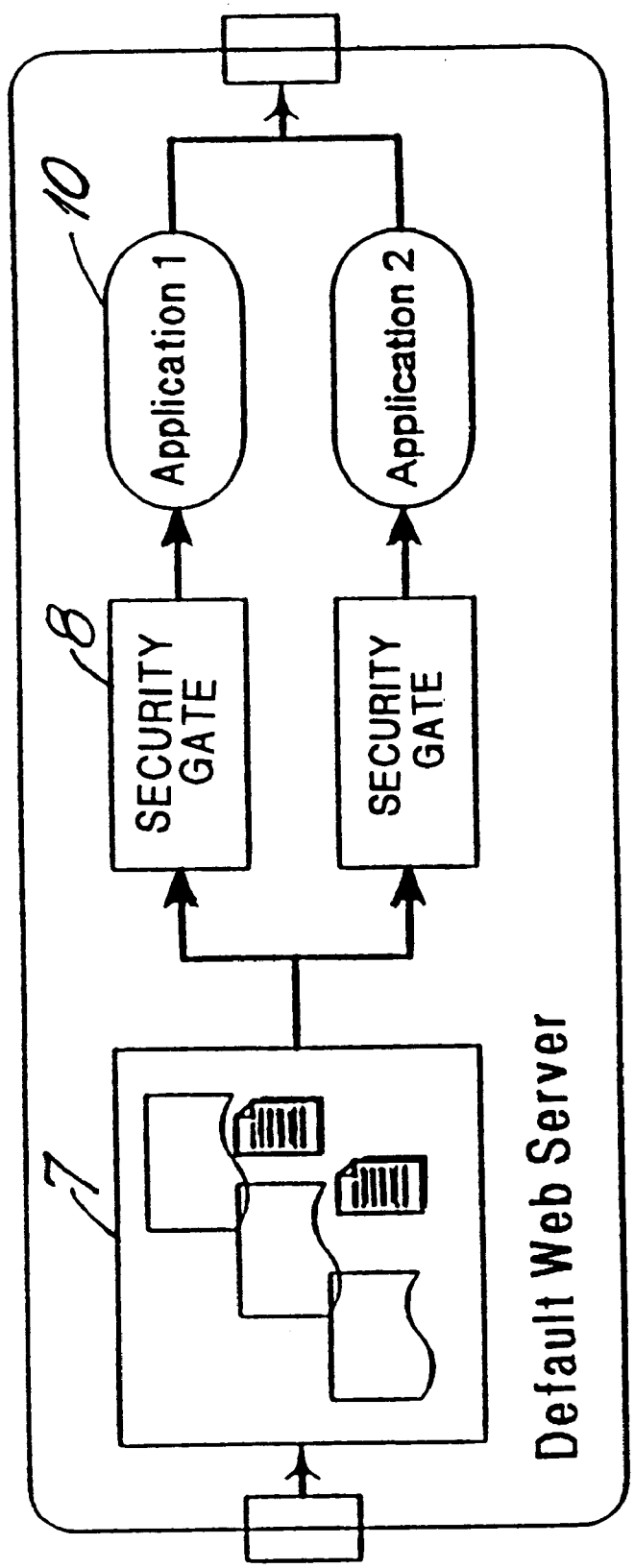
FIG. 14 is a diagram of legacy application/back-end environments.

FIG. 14 shows a web server used to display static web pages and to provide connectivity to back-end applications. The information is passed through a security gate at step 160. The data in a back-end application resides in its own compartment (has a unique sensitivity label), ensuring that the back-end application will be accessible only through the security gate 8. With this approach, any attempts to transmit information directly from the Internet interface to the internal interface, or vice versa, will be defeated.

It is not always possible for a server to predict the IP address that will be used by a specific user. For example, referring back to the top of FIG. 16, a user could be connecting to a service provider (ISP) that is using dynamic IP address assignment. A user may also be connecting from a public "info kiosk" or from a machine at some other location. It is often important in these instances to allow a user to gain access to restricted web servers or applications. The authentication module permits users to authenticate themselves to the system, with all subsequent requests in the user's session directed to the appropriate restricted service. A user connecting from a site that cannot use IP-level authentication at step 112 will be directed to the default web server at step 120. The default web site can allow access to the authentication module at step 122, which is a protected application running in a separate compartment and accessible only through the security gate.

In the preferred embodiment, the authentication module interaction is protected using SSL to encrypt all session traffic. Once the user has been authenticated, the authentication module provides a secret marker (cookie) at step 124 that will be inserted by the user's browser in subsequent communication with this system. The authentication module will also notify the UDE of the marker and the associated sensitivity label at step 128. After a user has been authenticated, the UDE thereafter redirects the user's incoming requests to the appropriate restricted web server. The UDE will enforce a timeout on the marker. If the marker has not been seen by the UDE for a period of time greater then the timeout period, the marker will no longer be valid. To reinstate the connection, a user will have to use the authentication module at step 122 again.

Figure 15:
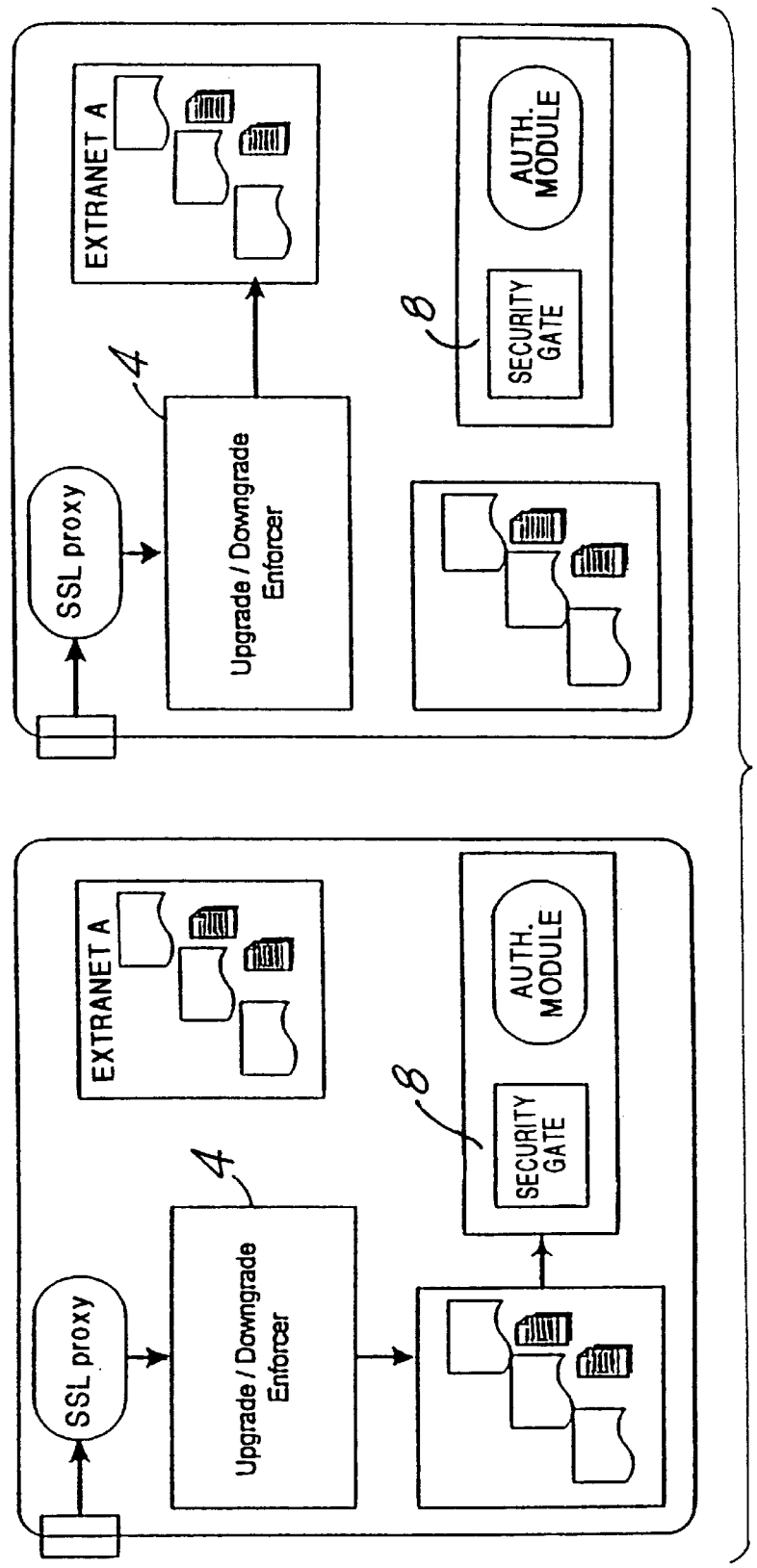
FIG. 15 is the authentication module data flow diagram.

FIG. 15 depicts traffic first flowing through the default web server and to the authentication module, and thereafter being redirected by the UDE to a restricted extranet.

Figure 12:
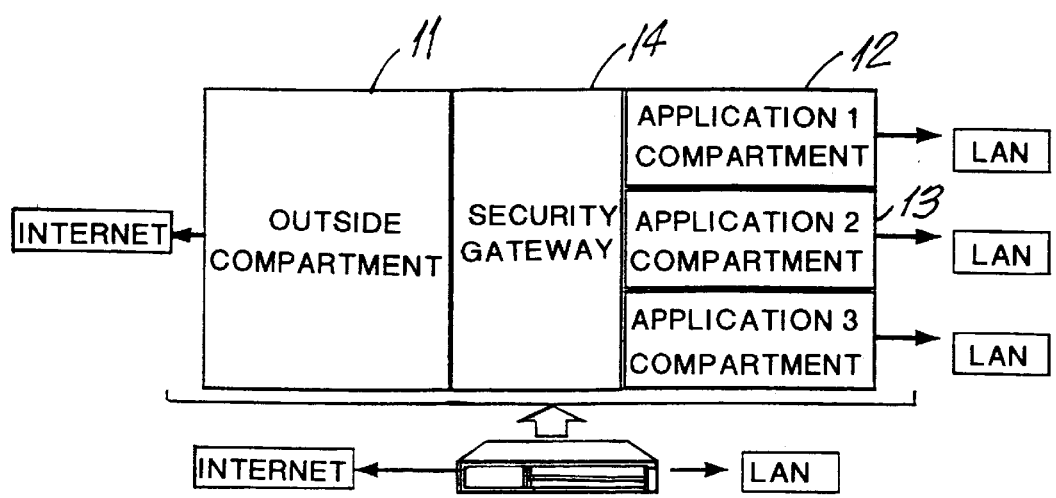
FIG. 12 is a high level block diagram of the invention.

The ability to partition a network server is a key component of the trusted operating system of the present invention in providing the level of assurance needed to support critical network and transaction servers. Referring to FIG. 12, processes, files, and other resources that have the same sensitivity label are said to be in the same compartment or partition 11. Programs, data, and network interfaces can be split into separate, isolated partitions with restricted access between them. For example back end applications related to specific functions may be stored in separate application compartments 12,13 that are isolated from each other and from the externally accessible compartment 11 that is accessible by the general public. Packets associated with one compartment cannot be read or spoofed by applications or network services in another. Partitioning is a critical security feature when a system will be handling different classes of users and jobs, such as users from different departments or network daemons interacting with different interfaces or hosts.

When a user connects to the trusted server or requests data via the trusted server, the processor associates the user with the table of processes that they are permitted to perform in coordination with the currently executing role or sensitivity level. Some processes may be performed anonymously such as might be the case when a user accesses a public Internet web page. The trusted server will direct the anonymous user to the partition where the user request is assigned a low level sensitivity label. The separate partition exclusively restricts the available processes and files that may be executed or viewed. The processes are bound by a security mechanism where the services such as http would permit access to only portions of the structure of the computer.

The process table may additionally have a set of user authorization privileges associated with the process that may describe the users individually or in a role. The kernel is adapted to check this secondary privilege and authorization information prior to granting access to the resource controlled or prior to the execution of any process requested.

In the preferred embodiment, the process table is an encrypted file stored on the trusted server that is a read only data structure. The management and control of this table is preferably accessed in the maintenance mode of the system. The management functions may be stored in a separate partition of the storage of the trusted server such that authorized users may execute the maintenance mode while in the administrative mode.

Authorization is an attribute of a user account under the trusted operating system that enables the user to execute a subset of operating system applications and utilities. Privileges are attributes assigned to applications that give them different grades of access to processes or resources. Together, these two sets of attributes enable programs to behave differently for different users. Applications can be extended to define and check new authorizations, providing a standardized protocol by which applications and the operating platform can communicate to grant permissions to users. Authorizations can additionally be used to divide administrative duties into separate roles, which can then be assigned to different users.

The user of the system may execute a process from a particular role which then assigns a sensitivity level of authority to the processes that follow the initial request submitted or received by the processor as generated from an initial user or system request. The kernel of the O/S does not allow the user to change his current user identification information during the session for that particular role. In this manner either the role or the privilege level required to perform the task requested is limited such that a lesser process that receives a request would only be permitted to pass on to subsequent processes the highest level that is supported by the request or process. For example, a user initiating a print request from a database application would initially be permitted access to only that portion of the database that the user is permitted to view based on their role. Each row of a database table may have an extended attribute reflecting the authorization level or role that is required to view that record. This may be defined at the row insertion point where the default permission for the row corresponds to the level of the user that inserted the row. In this manner, the report would determine the role of the user to determine the level of the records that may be retrieved. The printing process may then only cause to be printed those rows of the database that correspond to the level of the role. The printing process which is then initialized will either execute with the level of the submitter or the level of data retrieved, or the level of the printer device that the user selected. For example if the user selected a printer at a destination location that could not be secured to an adequate level to assure the safety of the content on route to the printer, only that data at the level that can be supported by that printer and route selected are ultimately sent to the printer. The printing process would not additionally be permitted to perform any other transactions executing higher level embedded process commands that may have been hidden in the data stream, since any command generated or executed, would only receive the role of the lowest level process. Even if a clever user or hacker could embed commands into other process steps, the system would not permit transactions to occur beyond the process level assigned since the primary administrative functions of the system are not enabled or even available to be executed from the storage partition of the system in the secure mode of operation. The printer processing step would therefore be indicated as such in the role assumed such that no other processes may be initiated beyond that role.

In an example where an Internet-based web user requests access to a resource behind the firewall, the system would initially determine from the level originally assigned how to direct the request and what processes it is permitted to initiate. The user may be prompted that the information requested is unavailable if their level is not authorized. The user may be informed that the data requested is not found, or the user may be able to login to the system using an additional security access process.

Network layer encryption is an optional component of this architecture. Because SSL (supported by Netscape, Microsoft, and others) is used to encrypt only HTTP session traffic, the primary purpose of the network layer encryption component is to authenticate an IP address. Host authentication is critical if access to certain functionality (e.g., the administration tools or restricted extranet web servers) is to be allowed based on which host the user is coming from. Although this system permits the use of any network layer encryption module (VPN), Sun Microsystem's SKIP is shown in the architectural diagram.

The SSL proxy 3 (see FIG. 1) is also an optional component of the present invention. SSL provides session layer encryption. Any particular user session may switch between SSL and unencrypted http traffic, according to how the web application has been written and configured. For example, a user may use an unencrypted channel when retrieving HTML pages from the default web server, but SSL can be enabled by an application that is handling sensitive or private information and requests. The SSL proxy will preserve all request information, such as certificates, ciphers, and cookies. This information is available to subsequent modules, such as the upgrade/downgrade enforcer (UDE) 4 and other web servers. This system uses a generic SSL proxy that can be replaced by other commercially available SSL products.

In addition to the partition based method of controlling access, a table is provided to allow process relationships to be defined such that users accessing the system with a particular sensitivity level will be directed to a different process or data file in response to a request for an object. In this manner a control method may be applied to a software application suite where each user is permitted to operate upon or view data at their sensitivity level. This may for instance, allow a commercial software product to be executed such that a hierarchical security system may be applied externally to the software application suite, where each user that executes the software would be supplied with a customized or personalized version. Some users can connect with one set of privileges while others may execute the same application with differing privileges. For example, a word processor application stored on the server of the present invention may be used by individuals to permit different levels of access to resources or content based on their identities and roles without defining or placing accessibility restrictions on the program with regular permission bits. This would dynamically allow the system to modify the content available to the user where this functionality is not typically provided to a user through the permissions of the word processing program. This enables this system to apply one set of security controls across all of the applications on the system instead of configuring each application separately using proprietary control methods specific to each application software program. By establishing this type of structure at the operating system level, the system administrator does not need to become familiar with the authorization mechanisms of each of the applications but may instead secure the data or process by the global controls of the present invention. In this manner a one-time application of attributes and authorizations may externally determine how the software executes. In a similar manner, instead of authorizing processes within the architecture of the application program, the actual process calls that are executed may be individually restrictively controlled at the operating system by performing this one time attribute definition. In the preferred embodiment, the system levels may be classified or defined according to departmental management levels of authority. In other embodiments the levels may be generated and applied according to a workflow-like methodology where a schedule may be applied to change the accessibility in relation to project milestones, timelines, delivery events, or other system events. For example, process stages may be established to selectively lock or freeze access to certain process execution steps or data access abilities, where users may have total privileges at one point in the process and later have none or read only ability on the data or execution of processes.

The control provided by the trusted server 22 may extend to other computer systems where access to a top secret computer may only be permitted following execution of a process on a trusted server where the user's execution of the application redirects data requests to the top secret computer system. This type of control is also used to provide access to other network devices and or partitions of machines where the process communicates with the other partition in controlled manner.

For example, network services, such as HTTP daemons and associated CGI scripts, can be given read-only access to some files (for example, critical web pages and CGI directories) and can be completely isolated from other resources (such as internal network interfaces, system files, and other network daemons). A network server configured in this way can protect its web pages and CGI scripts from ever being modified from an external connection, even if damaging bugs exist in the commercial software that allow incoming users to execute any random sequence of machine instructions. Access by the network services to other network interfaces and hosts can be easily limited as well.

This invention allows multiple web servers to be running, each in its own isolated partition. Access to each of the extranet's services is restricted by the UDE 4. In addition, as with all virtual web sites of this invention, individual files can be protected as read-only, thus preventing any malicious modifications to the web site should an exploitable hole be found in a commercial web server software suite installed on the server of the present invention.

Read-only files and directories can be shared by isolated web servers. This makes it possible to use a single copy of common web pages and applications, eliminating duplicate files and reducing administration overhead. The UDE and the extranet web servers can reside on the same physical machine, or the extranets can run on separate systems connected using network-level encryption and the security features of the ASN software.

This invention provides for both local and remote administration. The trusted administration utilities are accessible only to a user who has an account granting access to it, and only when that user is coming from an authorized host. The UDE uses the label applied by the ASN module to determine if an incoming packet can be routed to the trusted administration web server partition 6. In the preferred embodiment, the ASN module restricts administrative functions to those network devices within the intranet. For example, in a Unix-based system, the administrative functions associated with user administration, system shutdown and modifications of privileges and labels are only permitted to be accessed when the system has been internally initialized, using an INIT procedure executed by a specified administrator of the system.

This trusted server of this invention can be administered either through a direct login from the console or through a network connection. The network connection can be made either by using the enhanced SSH component or by using the trusted administration utilities. Access to the administration web server and the administration tools and utilities can be limited to specific IP addresses and specific network interfaces that have been configured to allow access to the administration partition. IP addresses are authenticated using the network-level encryption component.

This system additionally provides a browser-based administration tool to make system management straightforward. It is not necessary for the administrator to be familiar with Unix system management or other Unix management software. The browser-based tool can graphically display a map of processes that are executed in response to requests to assist the administrator in configuring processes for a particular task. Descriptive information is provided such that the administrator may trace the processes executed for a portion of the processes performed in order to either view the history of the processes executed or to test the application of sensitivity levels to the processes. The system may also assist in the definition of partitions where the processes may be segmented by roles prior to actual partitioning of the system. The system may in this manner be tested prior to implementation. Access to the system and partitioning may also be implemented such that geographic regions of users may be supported. Performance tuning may also be accomplished at this point by integrating simulation software into the system such that any processing routines may be replicated as required to achieve a desired process throughput. During actual use, this type of graphic utility may also assist in providing a representation of a user's process interactions and requests where the output may be directed to administrators using an email process for any processes that deviates from the predefined paths defined in the original system. The graphic representation that is ultimately chosen and tested may be frozen such that no other processes may be permitted. This graphic model of the system is modified into a tabular or linked list form that may then be used by the UDE and the security gate 8 to control process activities. In the same manner that each individual process may be analyzed, an overall system level analysis may be performed where each process may be traced back to the originating process stream or to determine overall process performance constraints.

As a reliable, secure basis for Internet transactions of all types, the present invention is a top-shelf security solution for any type of database gateway system. For example, medical organizations wishing to provide patient histories or prescription records to local and remote users via the Internet are necessarily concerned with patient confidentiality. This system provides a security framework for authorizing access for Internet users, as well as ensuring that the confidential data is protected from attack at the operating system level.

Because it maintains 100% compatibility with standard Solaris applications in the Unix version, this system can be used as a secure application platform for any commercial, off-the-shelf banking and electronic commerce applications, including those available from Broadvision, Netscape, Oracle, Ergon Informatik, Netlife GmbH, Neon, BEA, and others.

In addition to banking solutions, the present invention is ideally suited to many other types of financial systems, such as online brokerage and insurance operations. By providing a secure, compartmentalized framework for division of web-based transactions, this invention is additionally an ideal solution for industrial and medical supply-chain management systems, organizations limiting access by outside suppliers and other users to internal services create partitions that transparently segment a single system into many specialized virtual systems.

In a manufacturing environment, individual parts suppliers can have access to web sites containing customized entry screens; on the same system at the same time, managers in a secure partition can be running an order fulfillment database interface to facilitate cost comparisons between vendors and to coordinate shipping variables. Ordinary users, lacking proper authorization, are routed to the corporate public web site to learn about the company and its products and services. Packet labeling ensures that users authorized for one partition do not gain access of any type to services in other partitions.

In a medical environment, patient histories can be securely stored and delivered over the Internet between hospital branches, while separate web services provide prescription information to authorized pharmacists. Unauthorized users will be denied access altogether or routed to the organization's public web server. The labeling mechanism ensures that pharmacists authorized to use the prescription information partition are prevented from accessing information or programs in the patient history partition.

This invention can be used to create web sites that are accessible and readable across public networks, but remain completely protected from unauthorized outside modification. Using this invention, web pages can be stored in partitions that allow read access but not write access. In this way, administrators are assured that malicious parties cannot vandalize the web site by changing existing information, posting obscene materials, and otherwise altering the web site content. Web sites that incorporate this system are also protected from attack through the exploitation of bugs in web server applications.

The types of attributes that may be assigned are only limited by the available storage on the computer and to the extent that they provide some form of value or control within the system. A level of practicality may be employed by the administrators of the system to limit the levels available. A matrix-based access methodology may also be employed where for example, a user would have privileges to execute an application with a particular level of authority or access related to one project, while having no authority to execute the same process when working on a second project. This type of control has previously only been available in specific software applications where it is programmed to support multi-role users.

The trusted operating system of the present invention additionally employs enhanced account security features associated with the login of users such that the computer can provide a list of randomly generated pronounceable passwords, from which the user must select one. This feature prevents users from using common words or names as passwords. The system additionally supports long passwords where a maximum length is system definable (i.e. 31 characters). The trusted operating system provides a mechanism for replacing the default password encryption algorithms with alternative algorithms, through the replacement of dynamic libraries. The identification-and-authorization login process can be extended to include additional, system-specific authorization checks. An example of this is a program which can force "special privilege" accounts to log in with an additional account name and password for extra security. Other advanced measures, such as biometric identification or access tokens, can be accommodated using this feature.

The trusted operating system employs an enhanced auditing mechanism, which allows applications to trace a wider variety of security-related events than standard operating systems. The information on these transactions is appended to an audit trail in an isolated partition, which is protected by both discretionary and mandatory access control mechanisms. This approach prevents intruders from covering their tracks and eliminating traces of penetration attempts. By protecting the audit record, sufficient evidence is maintained to support litigation and law enforcement actions.

What is claimed is:

1. A method for assigning control and access attributes to data objects for a commercial software product executing on a trusted server, where access to the commercial software product is restrictively managed by the trusted server, the trusted server performing the steps of:
   a. executing the commercial software product in a configuration mode;
   b. determining at least one process to be accessed by the commercial software product while in the configuration mode;
   c. receiving administrator input for a least one sensitivity level to be assigned to the data files and processes;
   d. determining extended attributes to be applied to the processes and data files of the commercial software product;
   e. applying the determined extended attributes for the received administrator sensitivity level to the processes and data components of the commercial software product; and
   f. storing the extended attributes for use in a nonconfiguration mode.

2. The method for assigning of claim 1 with the commercial software product executing on the trusted server in the non-configuration mode further comprising the steps of:
   g) receiving a request related to the commercial software product at the trusted server comprising a request name, and address indicia;
   h) assigning a sensitivity level from the address indicia for the request related with the commercial software product;
   i) determining from the request a first location for a process to be executed for the commercial software product;
   j) retrieving the applied attributes for the process of the commercial software product stored at the first location;
   k) comparing the applied attributes to the assigned sensitivity level for the request; and
   l) executing the process requested where the process retrieved is correlated to the applied sensitivity level.

3. The method of claim 2 wherein the step of executing the processes requested comprises comparing the extended attributes of each process to be executed to the applied sensitivity level.

4. The method of claim 2 wherein the process is limited to those defined by the processes configured during the configuration mode.

5. The method of claim 2 wherein the user indicia comprises authorization information used in conjunction with the assigned sensitivity level to determine a role of the user.

6. The method of claim 2 further comprising the step of decrypting the request related to the commercial software product.

7. A method of controlling access to the processes of a trusted server that performs a secondary access check in addition to the owner, world and group access with associated read, write and delete authorization, comprising the steps of:
   a) segmenting the control aspects of the administrative user accounts of the trusted server such that all administrative functions cannot be performed by one administrative account;
   b) extending the attributes of the file system to include at least a sensitivity level attribute;
   c) assigning the sensitivity level attribute to each of the files and processes stored in at least one storage location in the file system;
   d) generating a table of processes of the system where the table contains relationships to the roles permitted to execute the processes;
   e) defining authorizations associated with the roles;
   f) establishing a hierarchy of processes related to a task to be performed by the system in response to a request;
   g) defining alternate destinations where files and processes may be retrieved from the at least one storage location in response to the request;
   h) receiving an incoming request for a process to be executed;
   i) assigning a sensitivity label to an incoming request for the process;
   j) determining a first destination for the process to be executed associated with the incoming request for the data object;
   k) reading extended attributes at the first destination associated with the process;
   l) redirecting the incoming request to an alternate destination for the process based on the combination of the sensitivity label of the incoming request and the extended attributes.

8. The method of claim 7 further comprising the step of transmitting the results of the process to the requester.

9. A trusted server computing system for permitting controlled execution of processes in response to a request comprising:
   a) storage means for storing a plurality of data objects with extended attributes in at least one data partition;
   b) processor means for receiving the request and executing processes in response to the request;
   c) assignment means for assigning a sensitivity level associated with the request for a selected data object;
   d) upgrade downgrade enforcer means for interpreting the request to determine a first destination to direct the processor means to retrieve a first process and extended attributes associated with the request, the upgrade downgrade enforcer means for comparing the extended attributes of the first process to the assigned sensitivity level, and passing any favorably compared processes to the processor means for execution;
   e) the processor means for identifying processes that require access to secured storage partitions of the at least one data partition and directing the identified processes with the assigned sensitivity level to a security gate means;
   f) the security gate means for receiving the assigned sensitivity level and interpreting processes requiring data from the secured storage partitions, wherein the security gate means retrieves the requested data if the sensitivity level associated with the selected data object is favorably compared to the assigned sensitivity level.

10. The trusted server computing system of claim 9 wherein the request is received from a networked user on a user computer.

11. The trusted server computing system of claim 9 wherein the request is generated by the processor means of the trusted server as an output of a prior request.

12. The trusted server computing system of claim 9 further comprising encryption and decryption means to encrypt or decrypt the request between system components.

* * * * *